US006636505B1

(12) United States Patent
Wang et al.

(10) Patent No.: US 6,636,505 B1
(45) Date of Patent: Oct. 21, 2003

(54) METHOD FOR SERVICE PROVISIONING A BROADBAND MODEM

(75) Inventors: Ray Wang, Centreville, VA (US); Paul Shieh, Westoborough, MA (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/322,515

(22) Filed: May 28, 1999

(51) Int. Cl.[7] .................. G01R 31/08; H04L 12/28; H04J 3/16
(52) U.S. Cl. .................. 370/352; 370/395.1; 370/465; 370/468; 370/254
(58) Field of Search .................. 370/252, 236, 370/395.1, 254, 399, 352, 395.2, 395.6, 401, 412, 465, 466, 469, 421, 426, 410, 437, 468, 463; 375/222; 709/227, 203, 217, 220, 222, 228; 714/749; 379/93.06; 713/201, 202

(56) References Cited

U.S. PATENT DOCUMENTS 6,084,881 A * 7/2000 Fosmark et al. ............ 370/397
6,343,083 B1 * 1/2002 Mendelson et al. ......... 370/466
6,345,071 B1 * 2/2002 Hamdi ...................... 375/222
6,424,657 B1 * 7/2002 Voit et al. .................. 370/412
6,463,079 B2 * 10/2002 Sundaresan et al. ........ 370/468

OTHER PUBLICATIONS

*The Architecture for Extending Service Provisioning and Selection to Home LAN*, Aug. 17, 1998, pp 1–16 (16 pages).

* cited by examiner

*Primary Examiner*—Steven Nguyen
*Assistant Examiner*—Duc Ho
(74) *Attorney, Agent, or Firm*—McDonnell Beohnen Hulbert & Berghoff

(57) ABSTRACT

A method for automatically provisioning a broadband communication service to a subscriber having a broadband modem. The method includes the step of transmitting a service request from the broadband modem to a central office, which is associated with a network service provider. The network is configured for service in response to the service request. The method further includes automatically configuring the broadband modem by transmitting a configuration signal from the central office to the subscriber. The configuration signal may be transmitted to the broadband modem over a POTS subchannel. Alternatively, the configuration signal may be transmitted to the broadband modem over a subchannel in a broadband service, such as a DMT subchannel for ADSL service.

27 Claims, 14 Drawing Sheets

A CPE Service Selection Application

PRIOR ART - *Fig. 1*

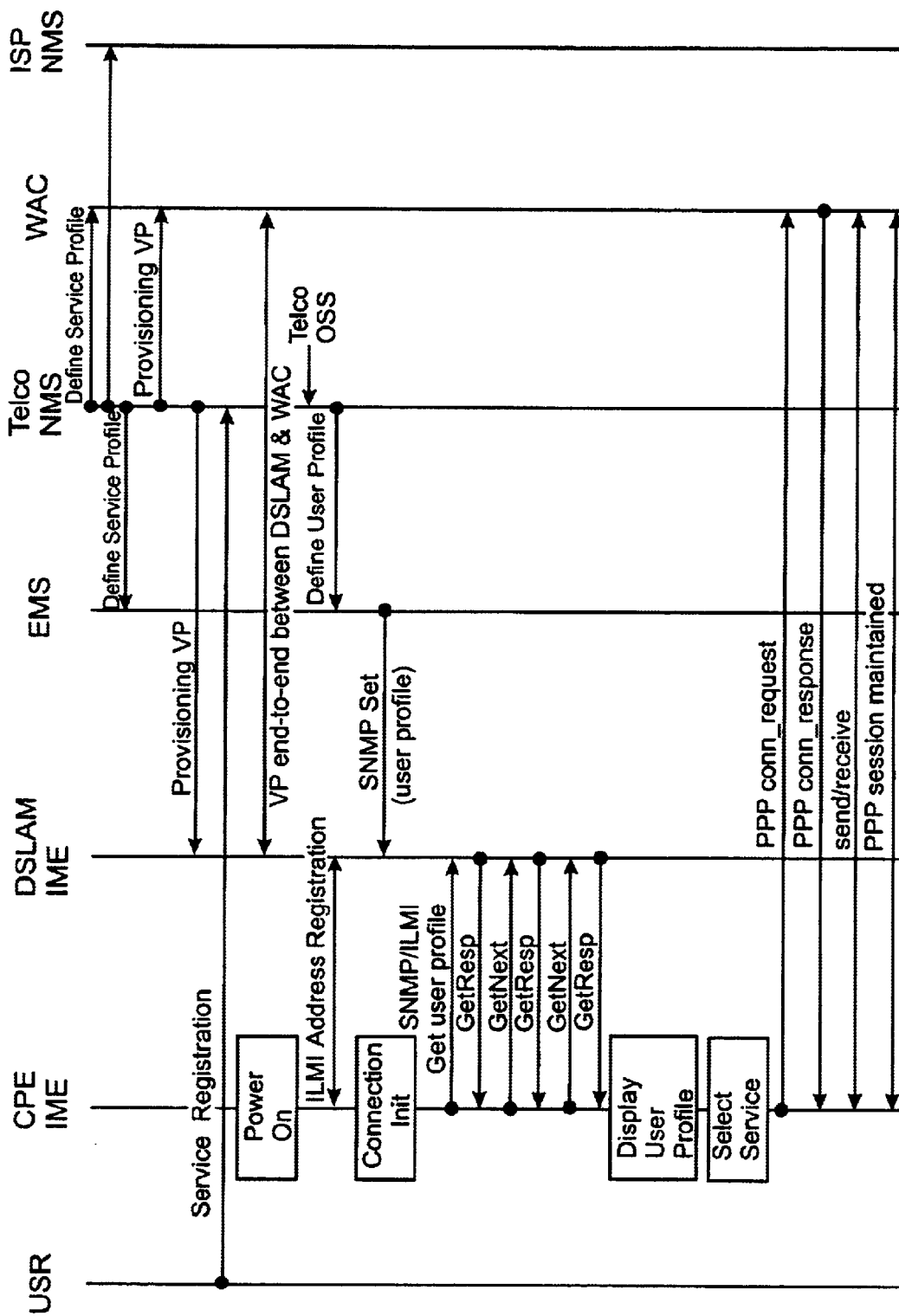
Fig. 5 Detailed service provisioning flows.

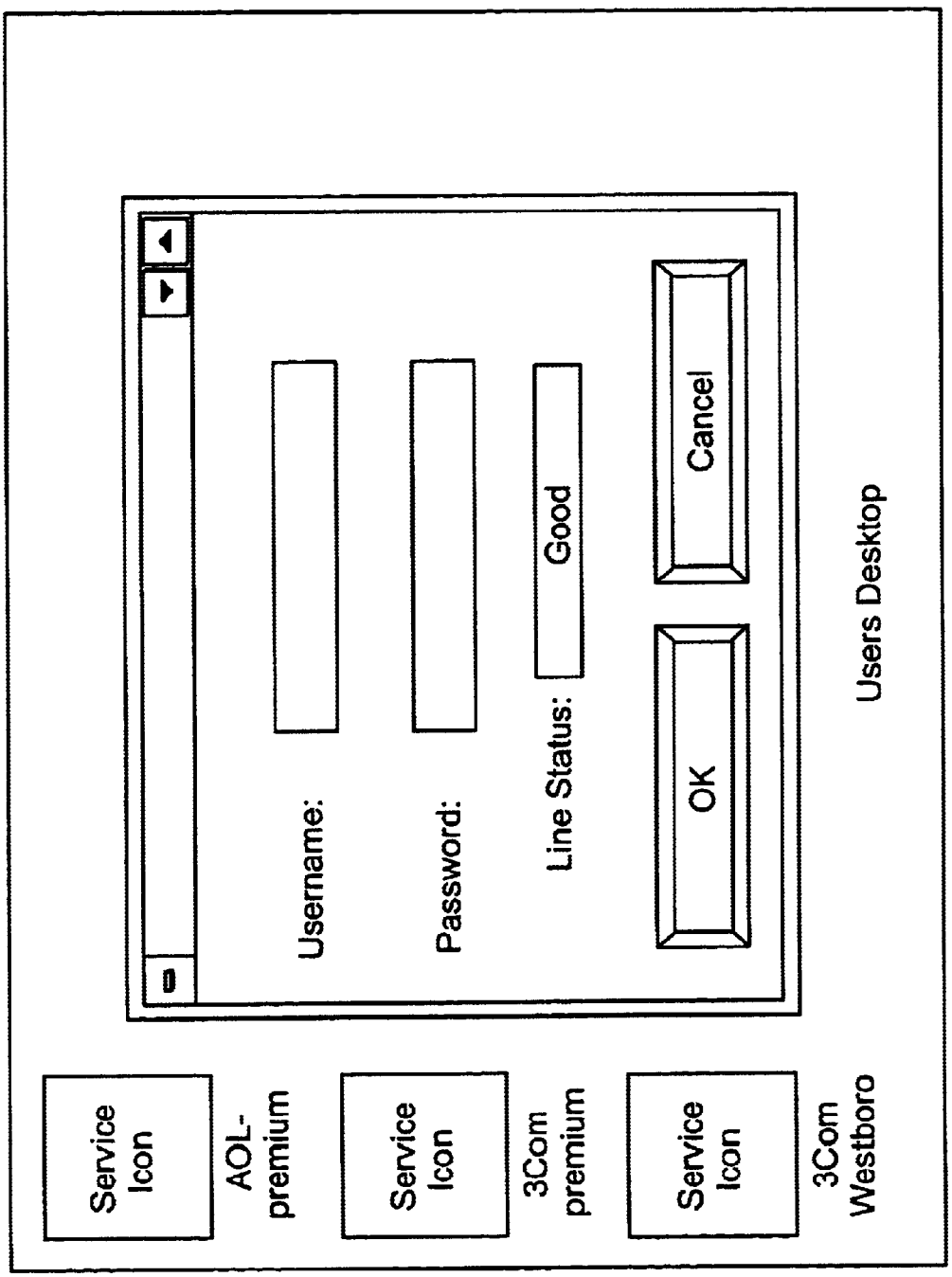
Fig. 6  A CPE Service Selection Application

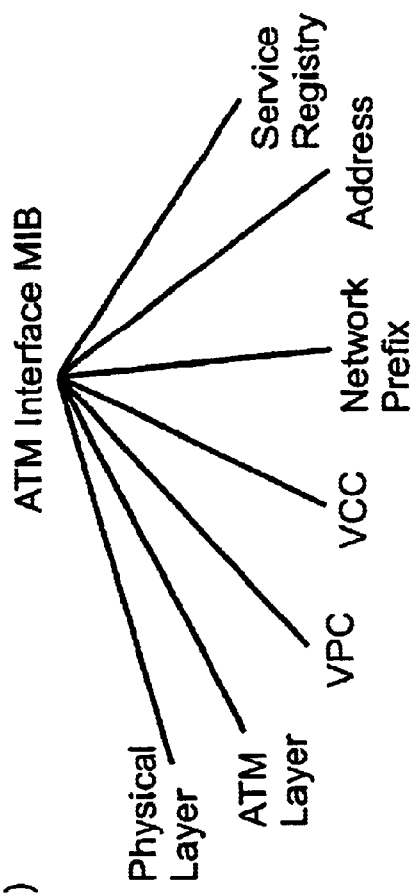
Fig. 7  ILMI 4.0 MIB tree and service MIB extension

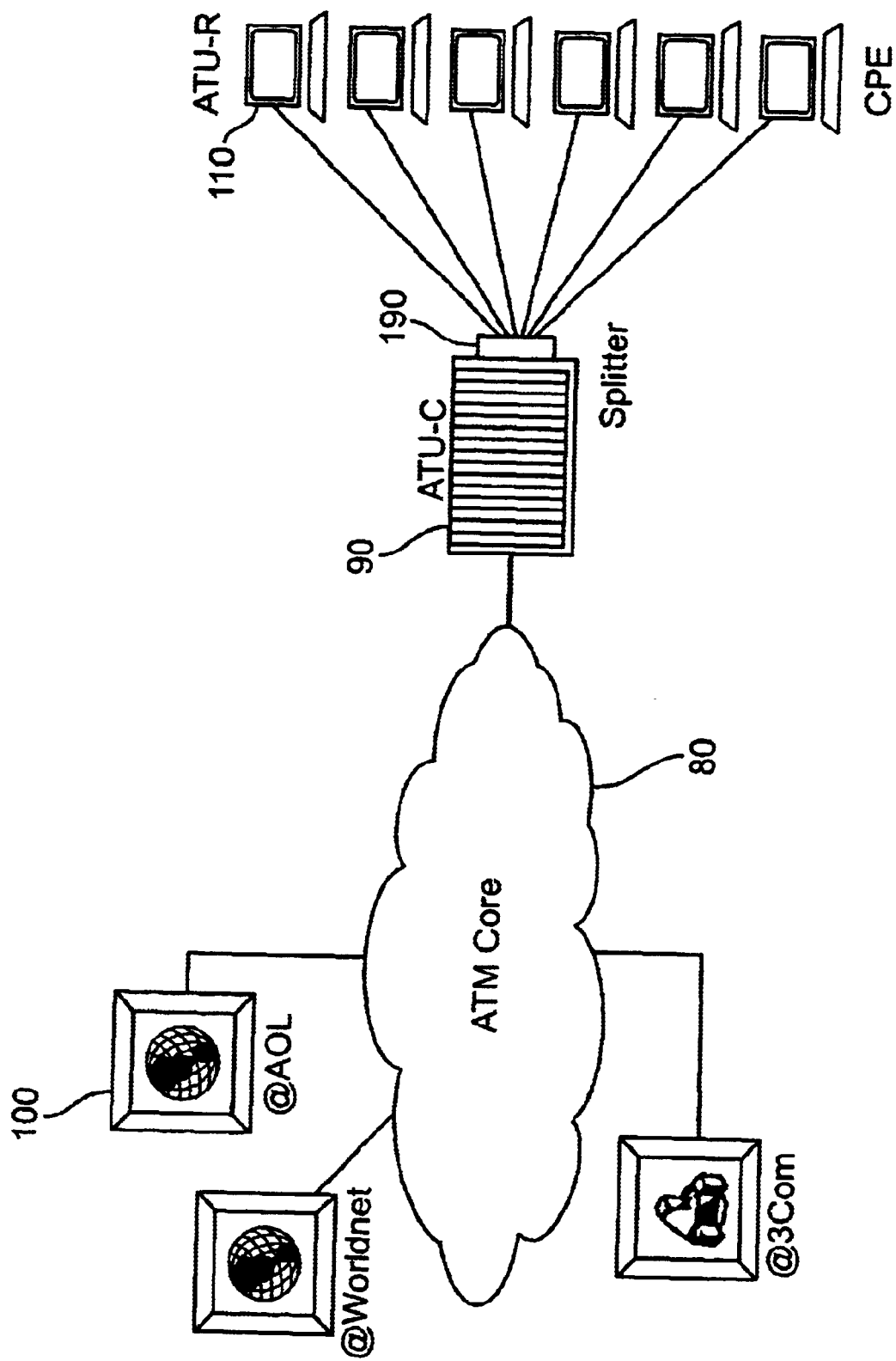
Fig. 8 Service Selection Scenario with Network Model

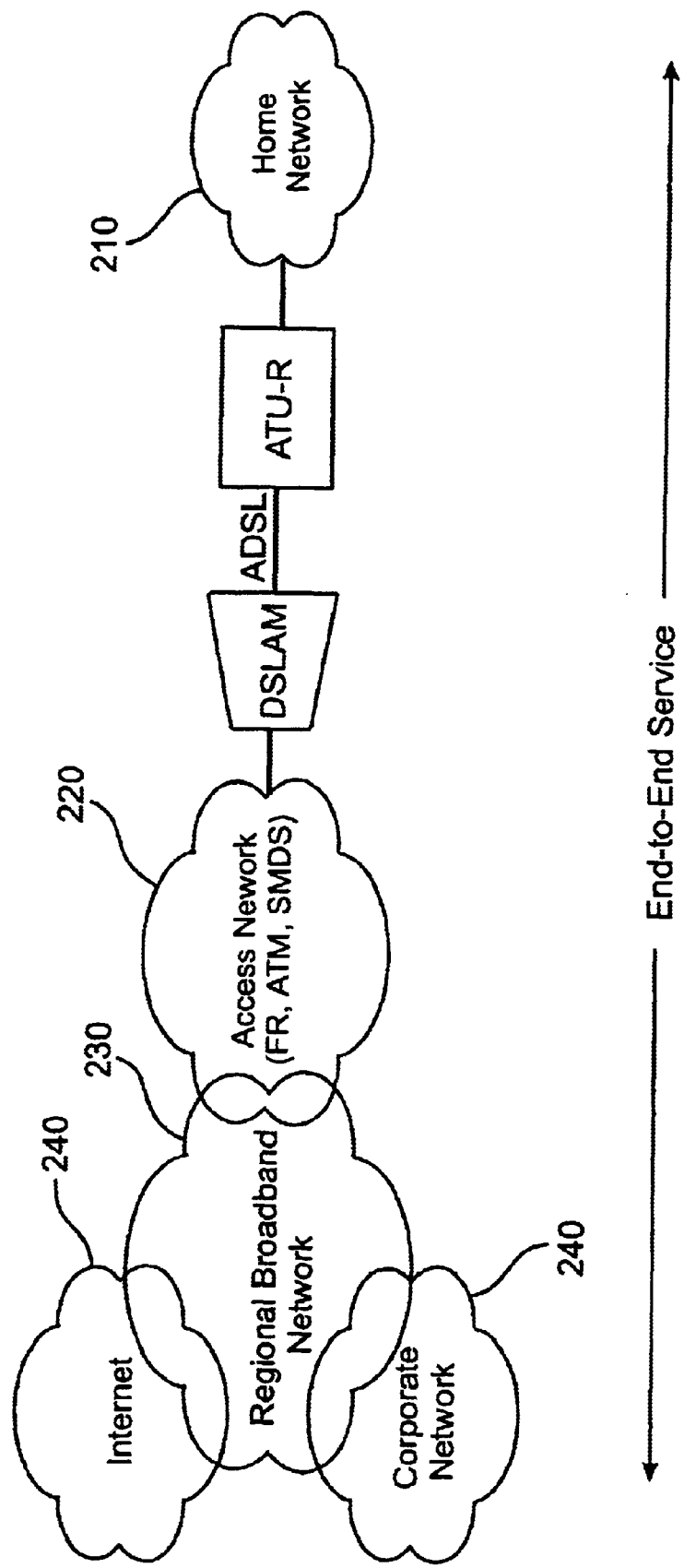
Fig. 9 End-to-End ADSL broadband access architecture

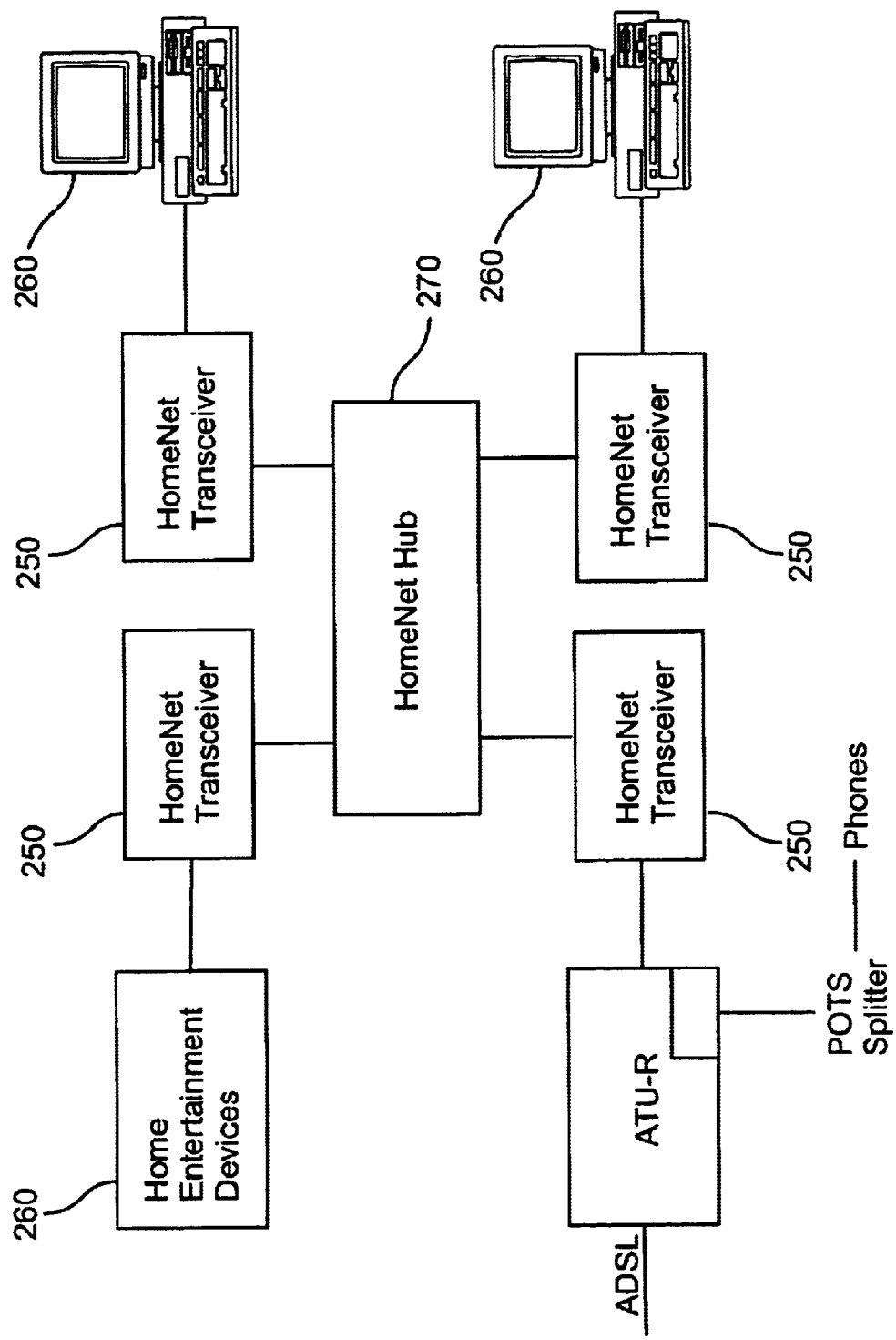
Fig. 10 Star-based Home Network

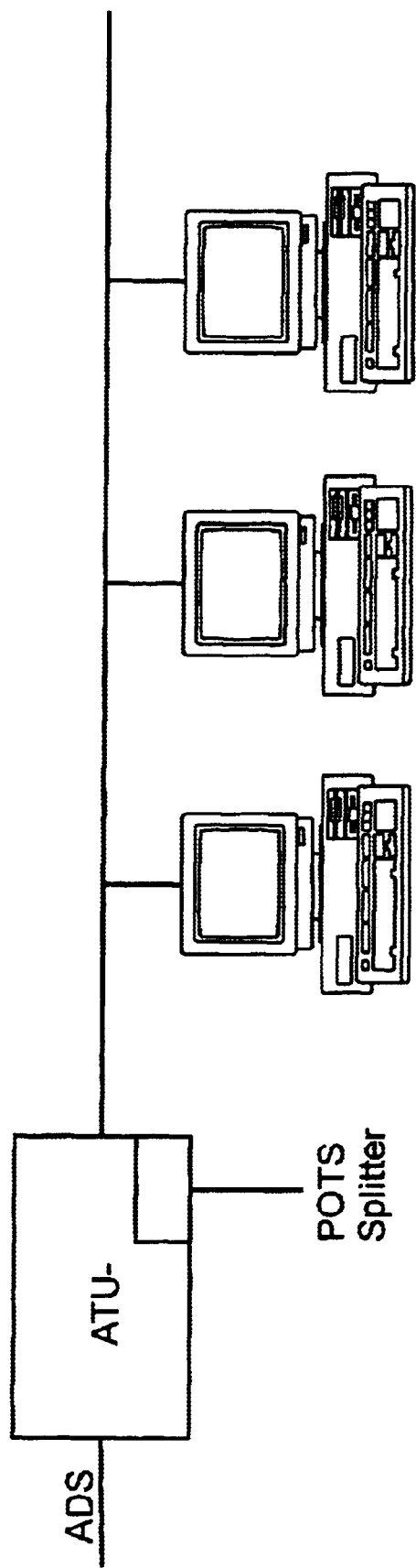
Fig. 11   Ethernet Based Home Network

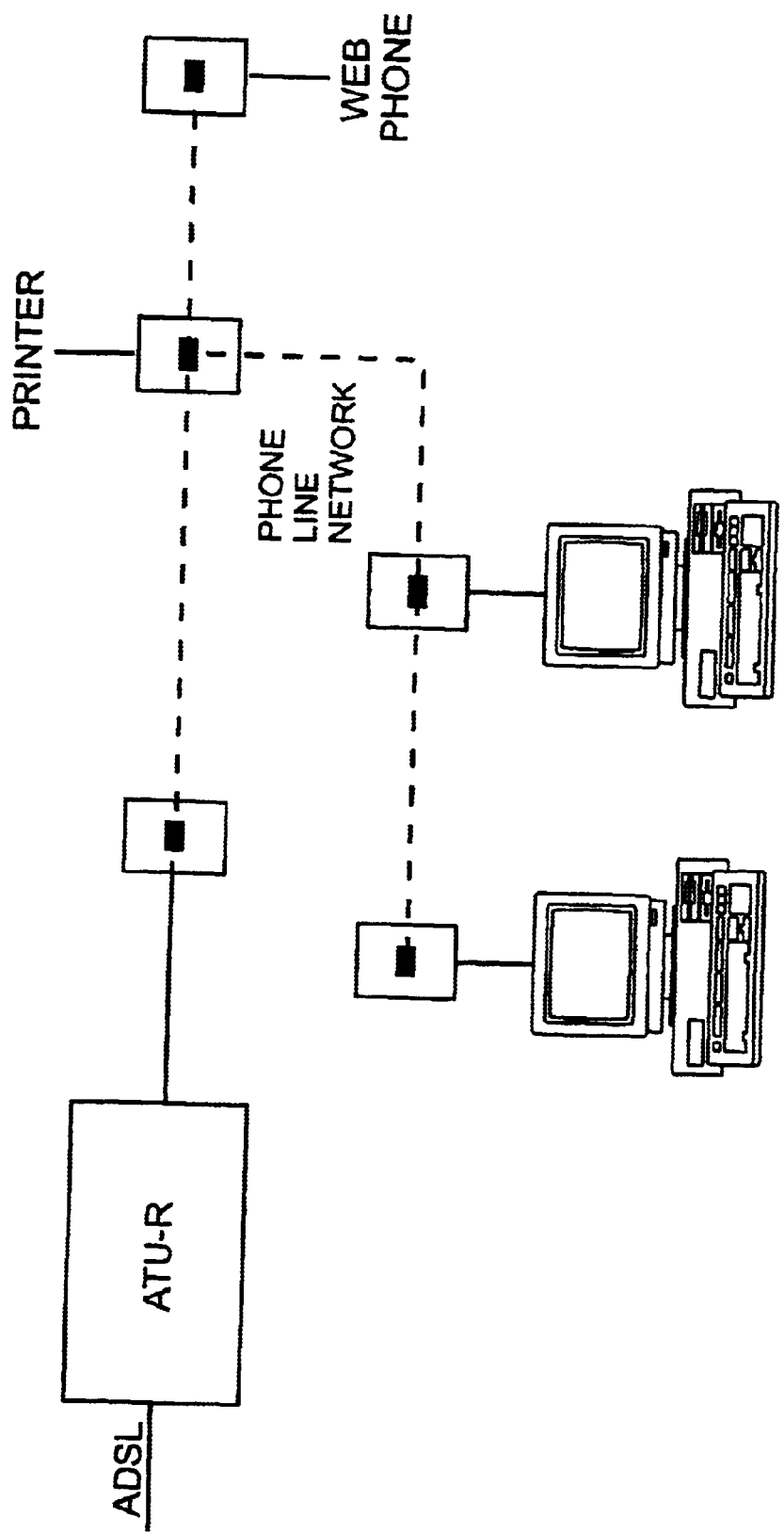
Fig. 12 Random Tree Based Phoneline "Network"

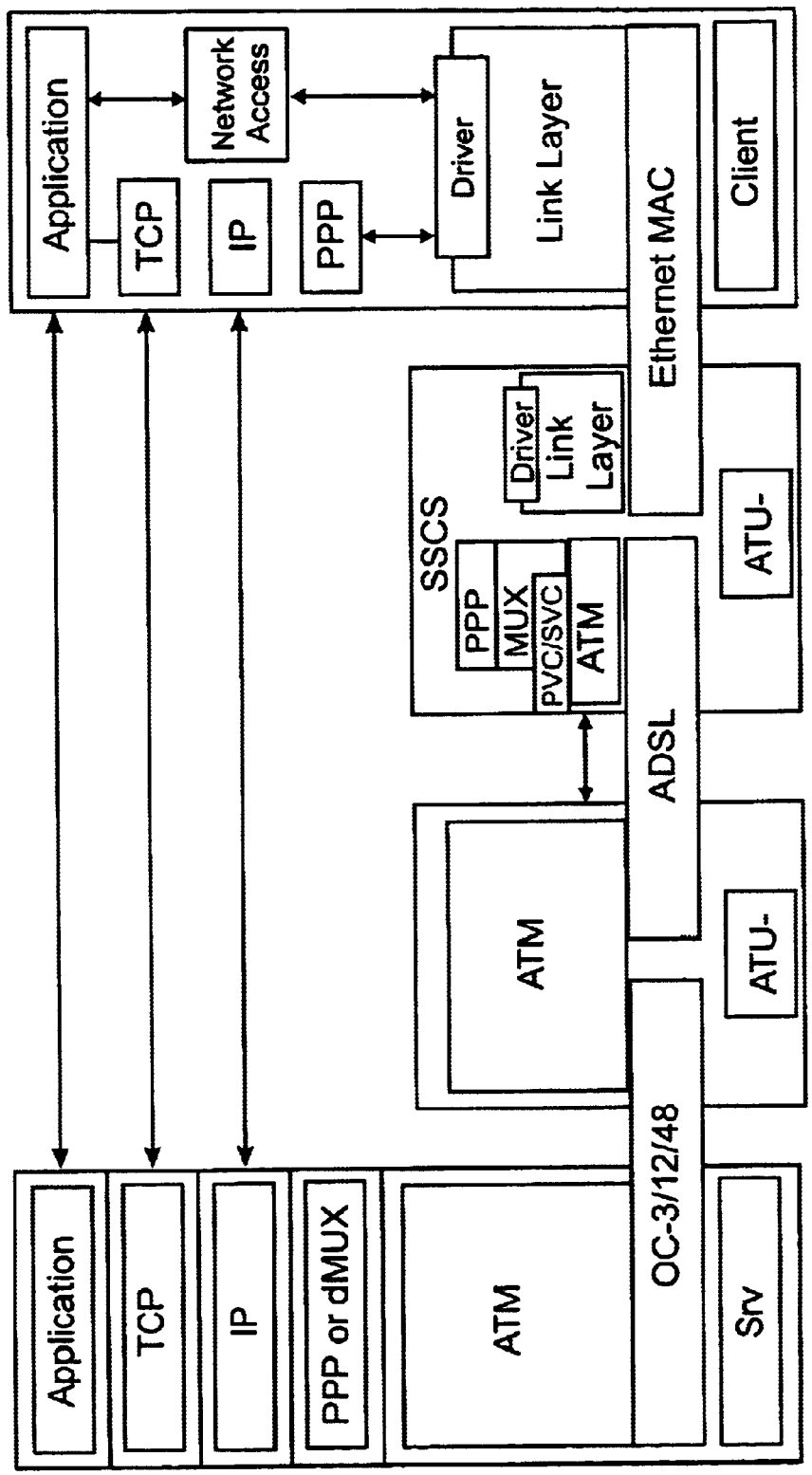
Fig. 13 Transparency Based Architecture for PPP Over Ethernet

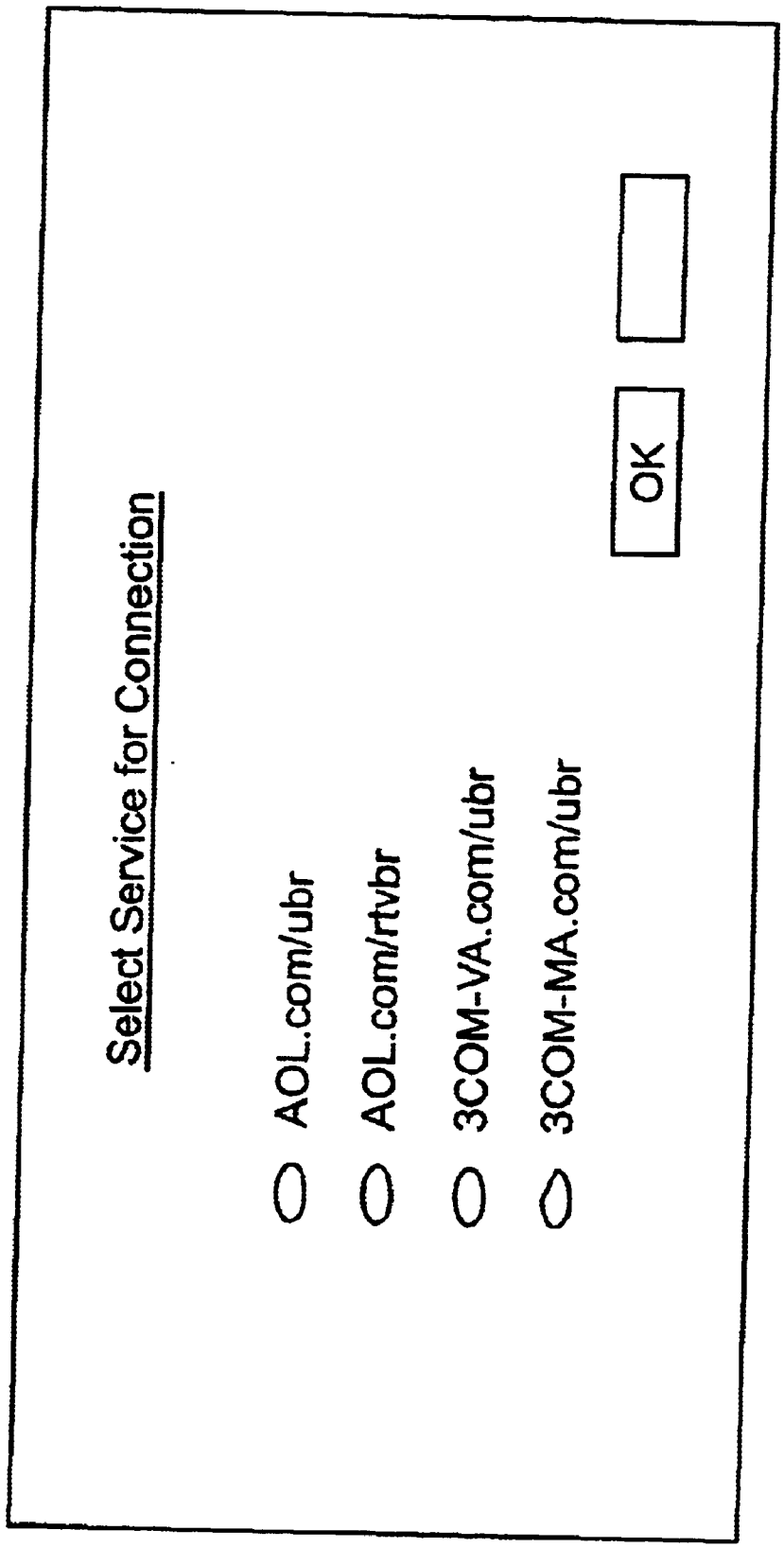
Fig. 14  User Profile (example)

METHOD FOR SERVICE PROVISIONING A BROADBAND MODEM

FIELD OF THE INVENTION

The present invention relates to a method for service provisioning a broadband modem. In particular, the present invention relates to a method for automatically provisioning a broadband communication service to a subscriber having a broadband modem

BACKGROUND OF THE INVENTION

There is widespread interest among users of computers in faster access to content provided by internet service providers ("ISPs"). In one sense, this interest appears to be driving the development of communication technologies that allow users to communicate with ISPs at higher and higher rates. A brief background of networking and a high speed communication service, known as Asymmetric Digital Subscriber Line ("ADSL") is set forth below as an introduction. In regard to related communication techniques, the entire contents of each of the following is incorporated herein by reference:
1. Integrated Local Management Interfaces (ILMI) 4.0, ADSL Forum, July, 1996
2. SNMP-based ADSL line MIB, Working Text Draft, ADSL Forum, Oct. 25, 1997
3. ILMI Based Service Provisioning for ADSL, ADSL Forum 98-025, Barcelona, Mar. 31, 1998.
4. Core Network Architectures for ADSL Access Systems, ADSL Forum 98-017, Barcelona, Mar. 31, 1998.

FIG. 1 shows a known technique for high speed communication service provisioning. A user 10 uses a telephone 20 to request a high speed service, such as ADSL, from a network service provider 30, such as by speaking with an operator 40 at a local central office location. A network service provider 30, also referred to as an NSP, is an access provider, in contrast to a content provider like an ISP. An engineer 50 at the central office then configures the network 60 for service in response to the user's request. Next, the network service provider 30 informs the user 10 of network parameters to be used by the user 10 to configure an ADSL modem within the user's personal computer 70. Content may be offered by an ISP 100 coupled to the network 60.

As shown in FIG. 1, the network 60 includes an Asynchronous Transfer Mode ("ATM") core 80 that is coupled to the computer 70 through a Digital Subscriber Line Access Multiplexer ("DSLAM") 90. As defined in Newton's Telecom Dictionary, 14th Expanded Edition, "ATM is a high bandwidth, low-delay, connection-oriented, packet-like switching and multiplexing technique." ATM and DSLAM device are well known to those skilled in the art of high speed communication.

A significant disadvantage to the technique shown in FIG. 1 is the involvement of the user 10 in configuring the ADSL modem in the personal computer 70. Communication devices, such as the personal computer 70, may be referred to herein more generally as the customer premise equipment ("CPE"). Specifically, the requirement of user 10 involvement may discourage some user's from requesting high speed service. There is also the danger of the user 10 misinterpreting the configuration information from the network service provider, or erroneously entering the configuration information. In addition, the involvement of the user 10 may cause the network service provider 30 to undertake the expense of providing technical support to the user.

DESCRIPTION OF THE RELATED ART

Networks are collections of independent devices that communicate with one another over a shared physical connection, or network medium. Networks are often categorized as Local Area Networks (LAN) and Wide Area Networks (WAN).

1. Local Area Networks

Local area networks are usually confined to a specific geographic area, such as an office building. LANs, however, are not necessarily simple in design, and may link together hundreds of devices, including computers, printers, scanners and the like. The development of various standards for networking protocols has made possible the proliferation of LANs in organizations worldwide for business and educational applications.

Ethernet is a LAN networking protocol commonly utilized today. Ethernet typically utilizes a "star" or "spoke" topology, where each device of the LAN is connected to other devices via a central hub. In such a configuration, each device has its own private connection to the LAN and can be disconnected from the network without interfering with any other device's connection.

Ethernet LAN technology was standardized by the Institute of Electrical and Electronics Engineers (IEEE) as the 802.3 specification entitled "Carrier Sense Multiple Access with Collision Detection (CSMA/CD) Access Method and Physical Layer Specifications." Initially, Ethernet technology used coaxial cable in a bus topology, however it has evolved to take advantage of new technologies such as twisted pair cabling (10 Base-T), fiber optics (10 Base-FL), and 100 Mbps operation (100 Base-X, or Fast Ethernet). The current standard is known as IEEE 802.3u, the contents of which are hereby incorporated by reference. One limitation of 10/100 Base-T is the requirement for "home run" cabling, i.e., each device is connected back to a central hub, as opposed to "daisy chain" connections.

The Ethernet system consists of three basic elements: the physical medium; medium access control rules; and a packet format. The physical medium is used to convey Ethernet signals from one device to another. The medium access control rules are embedded in each Ethernet interface, and allow multiple devices to access the shared Ethernet channel. The Ethernet packet, or frame, consists of a standardized set of fields used to carry data over the system.

2. Wide Area Networks

Interconnected LAN networks or individual users located in multiple physical locations are known as Wide Area Networks (WAN). The interconnections are performed via services such as dedicated leased phone lines, digital subscriber lines, dial-up phone lines, satellite links, and data packet carrier services. Wide area networking can be as simple as providing modems and a remote access server to allow remote users to dial in; or it can be as complex as linking hundreds of branch offices across the world using special routing protocols. Once type of WAN interconnection mechanism is Asymmetric Digital Subscriber Line.

3. Asymmetric Digital Subscriber Lines

Asymmetric Digital Subscriber Line (ADSL) is a communication system that operates over existing twisted-pair telephone lines between a central office and a residential or business location. It is generally a point-to-point connection between two dedicated devices, as opposed to multi-point, where numerous devices share the same physical medium. FIG. 1 illustrates a typical ADSL communication system.

ADSL supports bit transmission rates of up to approximately 6 Mbps in the downstream direction (to a subscriber device at the home), but only 640 Kbps in the upstream direction (to the service provider/central office). ADSL connections actually have three separate information channels: two data channels and a POTS channel. The first data channel is a high-speed downstream channel used to convey information to the subscriber. Its data rate is adaptable and ranges from 1.5 to 6.1 Mbps. The second data channel is a medium speed duplex channel providing bi-directional communication between the subscriber and the service provider/central office. Its rate is also adaptable and the rates range from 16 to 640 kbps. The third information channel is a POTS (Plain Old Telephone Service) channel. The POTS channel is typically not processed directly by the ADSL modems—the POTS channel operates in the standard POTS frequency range and is processed by standard POTS devices after being split from the ADSL signal.

The American National Standards Institute (ANSI) Standard T1.413, the contents of which are incorporated herein by reference, specifies an ADSL standard that is widely followed in the telecommunications industry. The ANSI ADSL standard specifies a modulation technique known as Discrete Multi-Tone modulation.

4. Discrete Multi-Tone Modulation

Discrete Multi-Tone (DMT) uses a large number of subcarrier channels that are spaced close together. Each subcarrier may be modulated using a type of Quadrature Amplitude Modulation (QAM). Alternative types of subcarrier modulation include Carrierless Amplitude-Phase (CAP), Multiple Phase Shift Keying (MPSK), including Binary Phase Shift Keying (BPSK) and Quaternary Phase Shift Keying (QPSK), and Differential Phase Shift Keying (DPSK). In DMT systems using QAM, for example, the data bits are mapped to a series of symbols in the I-Q complex plane, and each symbol is used to modulate the amplitude and phase of one of the multiple tones, or subcarriers. Specifically, each symbol is used to specify the magnitude and phase of a subcarrier, where each subcarrier frequency corresponds to the center frequency of a "bin" associated with a Discrete Fourier Transform (DFT). The modulated time-domain signal corresponding to the sum of all the subcarriers can then be generated in parallel by the use of a well-known DFT algorithm, the Inverse Discrete Fourier Transform (IDFT).

The symbol period is relatively long compared to single carrier systems because the bandwidth available to each carrier is restricted. However, a large number of symbols is transmitted simultaneously, one on each subcarrier. The number of discrete symbols that may be distinguished on a single carrier, or within a bin, is a function of the noise level of the channel. Thus, the signal set, or constellation, for use with each subcarrier channel or bin may be determined based on the channel's noise level within the relevant subcarrier frequency band.

Because the symbol period is relatively long and is followed by a guard band, intersymbol interference is a less severe problem in DMT systems than in single carrier, high symbol rate systems. Furthermore, because each subcarrier channel has a narrow bandwidth, the channel impulse response is relatively flat across each subcarrier frequency band.

The ANSI ADSL standard for DMT, ANSI T1.413, specifies 255 subcarrier channels or bins, each separated by approximately 4.3 kHz and each modulated at 4000 symbols per second. Each subcarrier can be independently modulated using known QAM techniques to achieve a maximum bit packing of 15 bits/Hz. This therefore allows up to approximately 60 kbps per tone. DMT transmission allows modulation and coding techniques to be employed independently for each of the bins.

In DMT systems, therefore, the modulation rate may be adaptively adjusted to line conditions for each of the bins. Many of the typical line impairments, including crosstalk, impulse noise and group delay, are frequency selective. Accordingly, bins having subcarrier frequencies that show greater impairments may carry lower bit rates, and bins that are less affected by the impairments may be assigned higher bit rates.

The bins overlap spectrally, but as a consequence of the orthogonality of the transform, if the distortion in the channel is mild relative to the bandwidth of a bin, the data in each bin can be demodulated with a small amount of interference from the other bins. For high-speed, wide-band applications, it is common to use a cyclic-prefix at the beginning, or a periodic extension appended at the end, of each symbol to maintain orthogonality. Because of the periodic nature of the FFT, no discontinuity in the time-domain channel is generated between the symbol and the extension. It has been shown that if the channel impulse response is shorter than the length of the periodic extension, bin isolation is achieved.

5. Small Office and Residential Phone Wiring

Many users, particularly small office and home users, are connected to their local central office by an ordinary analog subscriber loop, referred to herein as Plain Ordinary Telephone Service (POTS). POTS operates over numerous types of existing wiring layouts. Typically, the topology is a star configuration, combined with daisy chained connections for some phones. The type of wiring is also random—twisted pair, untwisted, various gauges, various numbers of wires (with possible crosstalk)—which creates a wide variation in the channel characteristics. Furthermore, the topology changes from time to time as phones are connected, disconnected, etc.

Thus the channel characteristics in a residential application are very noisy and distorted, including phase distortion (group delay) and severe reflections (echoes from signals bouncing off unterminated wiring segments) and spectral dips due to unterminated wiring stubs. In addition, signals associated with the analog phone service include 48 vdc, and 100 volt ring signals. Ring signals are not zero-crossing switched, so high-frequency noise is produced. Any system operating over existing telephone wiring must contend with this environment.

While user friendly services do not insure success, complex and hard to use services may invite failure. On their own, ATM and ADSL are relatively complex technologies. Combined as a service to the home or small business office user, ATM and ADSL present a difficult challenge to the objective of user friendless. It would therefore be desirable to have a method for service provisioning a broadband modem.

BRIEF DESCRIPTION OF THE DRAWINGS

FIG. 5: Detailed service provisioning flows.

FIG. 6: A CPE Service Selection Application

FIG. 7: ILMI 4.0 MIB tree & service MIB extension

FIG. 8: Service Selection Scenario with network model

FIG. 9: End-to-End ADSL broadband access architecture

FIG. 10: Star based Home Network

FIG. 11: Ethernet based Home Network

FIG. 12: Random tree based phoneline "network

FIG. 13: Transparency based architecture for PPP over Ethernet

FIG. 14: User profile (example)

DETAILED DESCRIPTION OF PRESENTLY PREFERRED EMBODIMENT(S)

Figure 1:
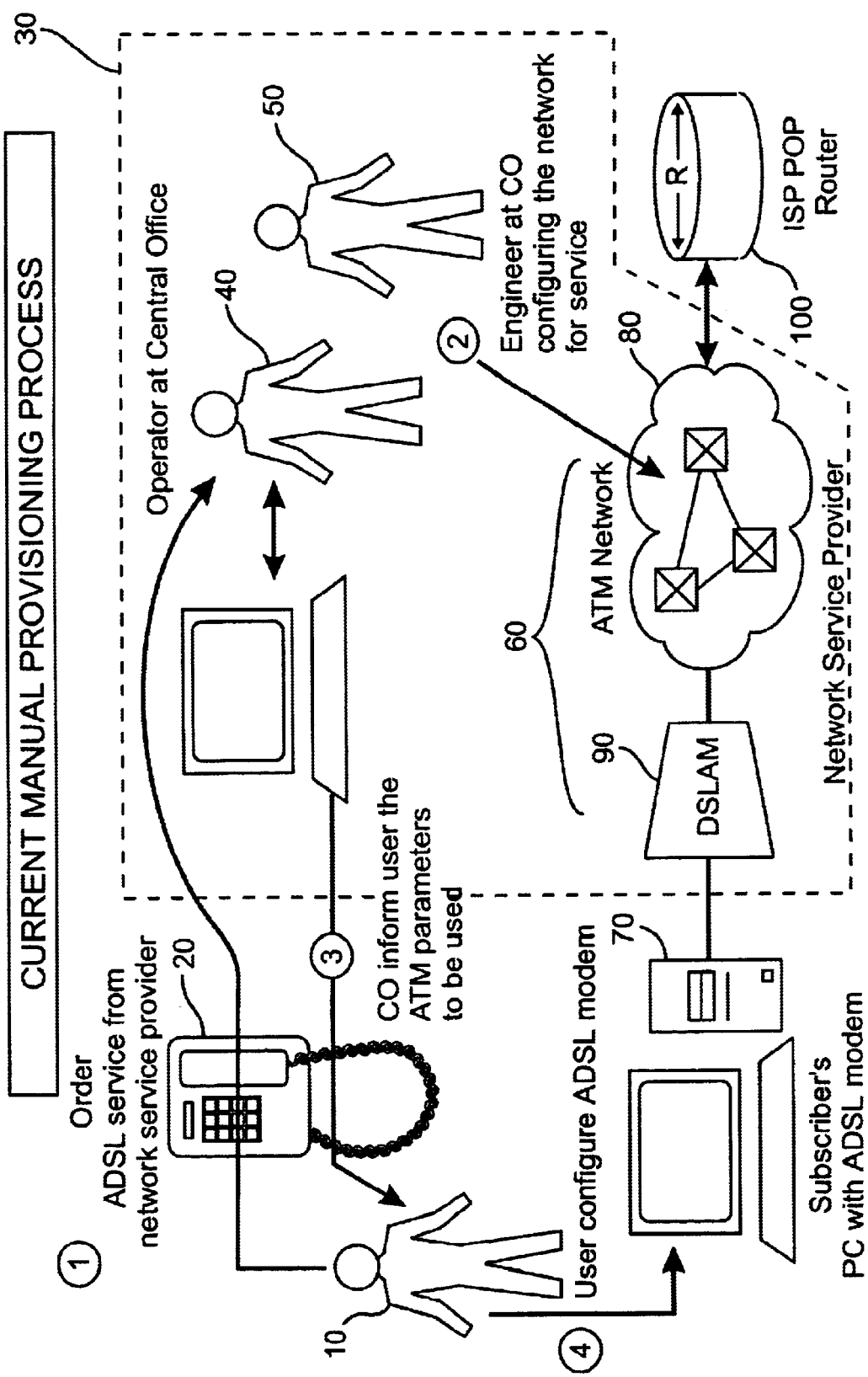
FIG. 1 is a functional and schematic diagram of a known service provisioning process.
Figure 2:
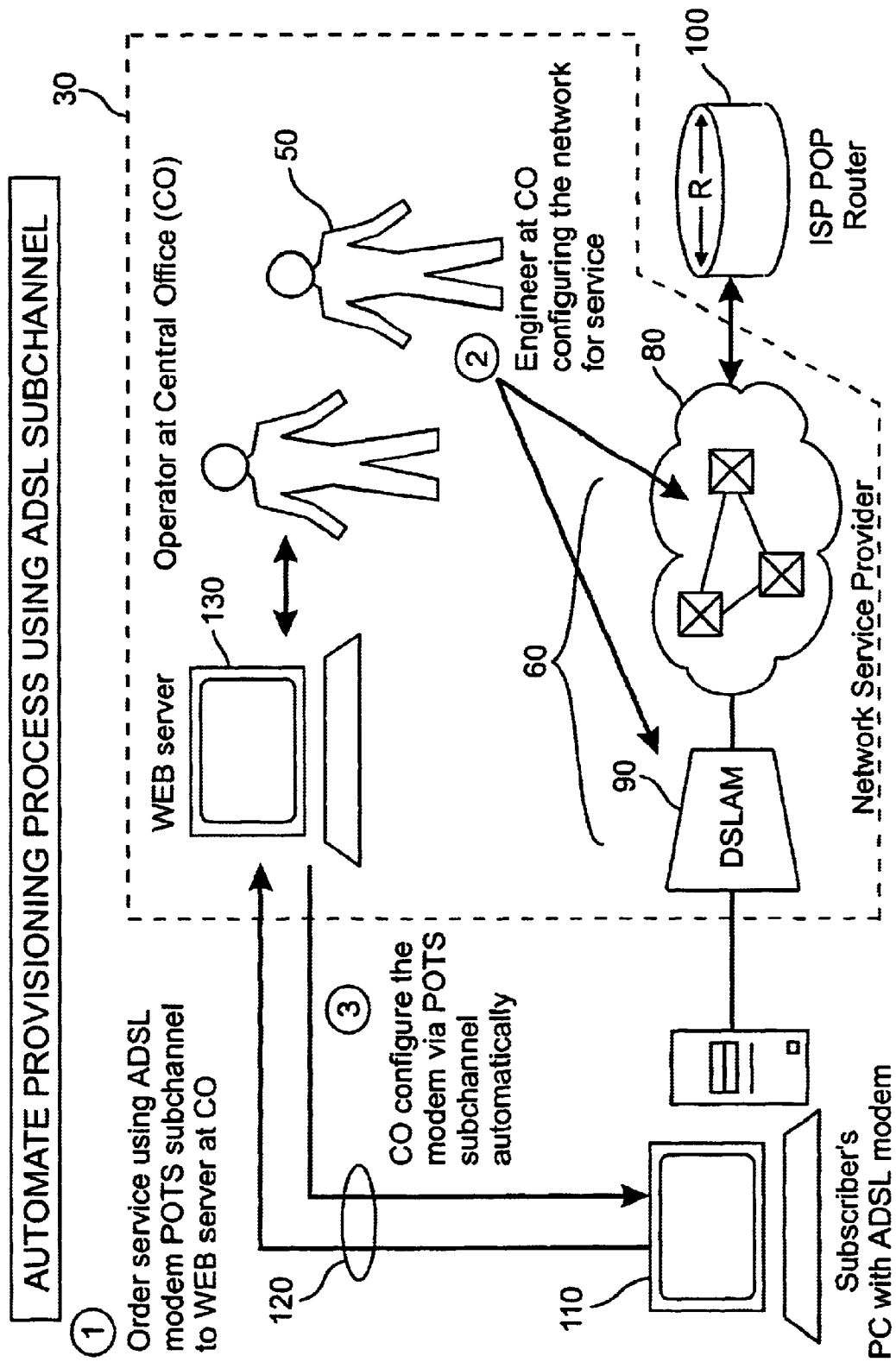
FIG. 2 is a functional and schematic diagram of a service provisioning process in accordance with a preferred embodiment of the present invention.

The presently preferred embodiments will now be described with reference to the drawings, wherein like elements are referred to by like numerals. FIG. 2 is a functional and schematic diagram of a service provisioning method in accordance with a preferred embodiment of the present invention. A subscriber's customer premises equipment (CPE) 110 includes a personal computer that has an internal ADSL modem. The CPE 110 is connected by a communication channel 120 to a server 130 in a central office of a network service provider 30.

As shown in FIG. 2, the communication channel 120 may be a POTS subchannel. As used herein, the term POTS subchannel may be used to refer to a DMT subchannel that occupies the POTS frequency range, i.e. approximately 0–4000 Hz, as well as referring to POTS. As further shown in FIG. 2, the server 130 is preferably a WEB server, although any type of server may alternatively be used.

The ADSL modem in the CPE 110 may be automatically provisioned as follows. The subscriber orders service from the network service provider 30 by transmitting a request over the communication channel 120 from the CPE 110 to the server 130. Next, the network service provider 30 configures the network 60 for service, such as ADSL ATM service. Once the network 60 is configured, the ADSL modem in the CPE 110 is automatically configured for ADSL service by the server 130 over the communication channel 120. The configuration of the ADSL modem is further described below.

Two methods are currently available for remote access: narrowband using analog modem and broadband using xDSL or cable modem. One unique requirement for the broadband access is the service provisioning process must to take place before data transmission.

Unlike PSTN dial-up approach for narrowband, broadband uses much higher bandwidth provided by ATM or Frame Relay network infrastructure for communications. In either case, a virtual circuit with differentiated quality of service is associated with different applications to provide best services to customer. In other words, virtual circuit must be configured between user and service provider in order to start the data transmission. Virtual circuit information is located in central office. In order for user to use the service, she (he) has to receive that information from service provider and manually type in to CPE when it is powered first time.

Because of the complexity involved in the virtual circuit configuration, user's intervention should be minimized in order to maximize serviceability. Service provisioning automation is the process to meet that objective—user does not need to configure virtual circuits.

Service provisioning can apply to xDSL and cable modem environment, and to other broadband environments such as fiber optic, wireless, and other environments. For ADSL, the remote terminal unit, ATU-R, needs to obtain the service provisioning information from central terminal unit i.e., ATU-C. ATU-R is a generic term for a remote version of DSL equipment, such as the ADSL modem in the CPE 110. ATU-C is a generic term for a central office version of DSL equipment, such as the DSLAM 90.

A preferred embodiment of the present invention suggests using default VPI/VCI and the DMT subchannel as transmission medium for transmitting the provisioning data from ATU-C to ATU-R. That is either partial or full DMT subchannels are used for service provisioning after ATU-R entered the steady-state i.e., SHOWTIME. SHOWTIME is a terminology used in T1413 Issue 2, G.992.1 and G.992.2 the contents of which are incorporated herein by reference. SHOWTIME is a result of the successful ADSL transceiver initialization process which is required in order for a physically connected ATU-R and ATU-C pair to establish a communications link.

An HTML window application may be presented at ATU-R and prompted for "UPLOAD SERVICE PROVISIONING". Once "OK" is pressed, ATU-R invokes TCP/IP or UDP/IP stack to communicate with ATU-C based on a client and server relationship. TCP/IP or UDP/IP packets communicated between ATU-R and ATU-C are using AAL5 which in turn using default VPI and VCI over DMT subchannels. Either TCP or UDP is applicable for the communication.

Once the service provisioning data is download to ATU-R, a message will indicate user that the service is ready and user data sessions may begin. All the DMT subchannels will then be used for user data transmission.

A preferred embodiment automates the service provisioning process, which is necessary to start a broadband service in xDSL environment. It "borrows" unused DMT subchannels for physical medium transmission after ATU-R entered the state of SHOWTIME successfully. Provisioning data is transmitted to ATU-R through HTML/TCP/IP/AAL5 stacks and use default VPI/VCI. After the usage, all DMT subchannels are then for user data only.

Figure 3:
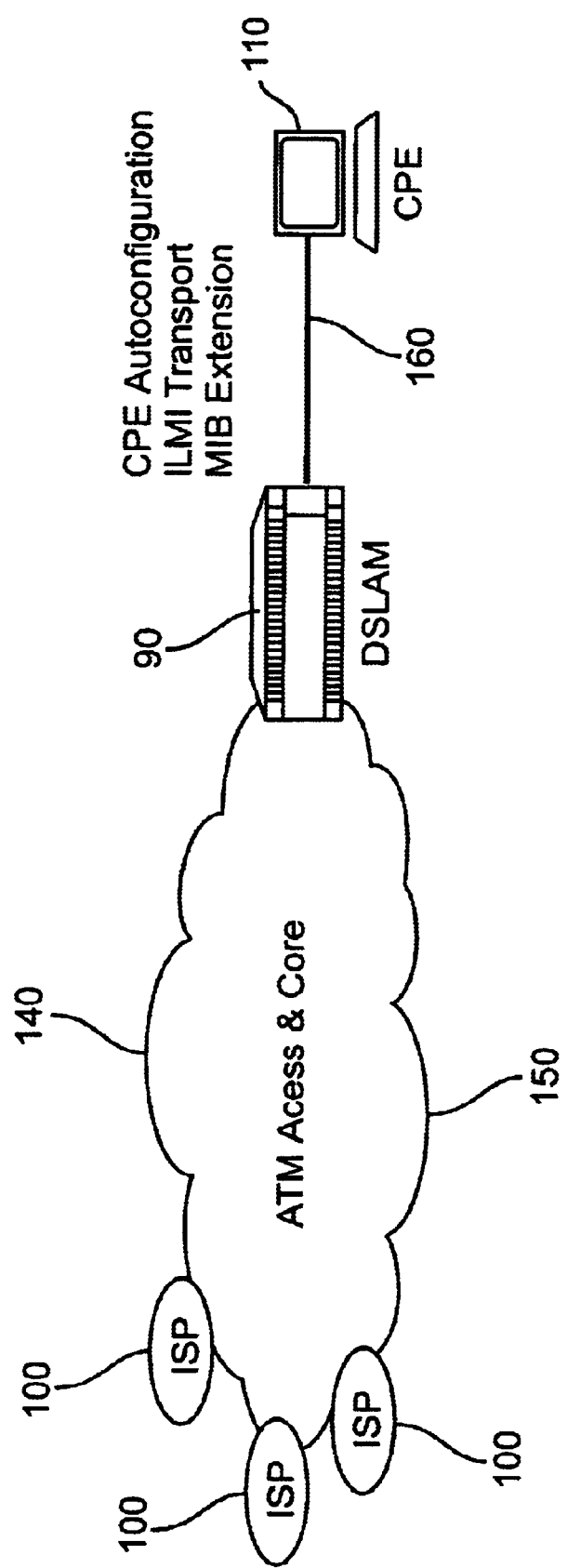
FIG. 3: ILMI based automatic service provisioning scheme

In accordance with a preferred embodiment of the present invention, an ILMI based automated service provisioning method is provided. The method will be described with reference to a user having an ADSL connection to the network service provider 30 which is preferred. However, this method may also be used in a xDSL or a HDSL environment. The interface, management flow, and transport between DSLAM 90, CPE 110, and network management system (not shown) are defined to support automated service provisioning of the subscribers CPE 110 when connected to the network. Scenarios based on the ILMI user profile are presented to demonstrate the service provisioning model. New ILMI service management information base ("MIB") definitions and extensions are proposed to meet the broadband service needs. FIG. 3 shows a schematic diagram for an ILMI-based automatic service provisioning method. A number of ISPs 100 are coupled to a network 140 that includes ATM access and an ATM core 150 and a DSLAM 90. The DSLAM 90 is connected by a subscriber line 160 to the CPE 110.

Delivering automated service provisioning features to subscribers is one of the key requirements for the broadband services in ADSL systems. In order to provide automatic provisioning of the subscribers CPE 110 the following information must be provided: transport mechanism, information flow, and interfaces in to the customers CPE to carry information regarding network and service provider configuration.

The ILMI provides the definition of MIBs and procedures for the management of the ATM network and client end of an user network interface ("ATM UNI"). The adoption of ILMI for the service provisioning may enable an automated and "user friendly" service that will provide the advantages of CPE hand free configuration, integrated service management for the operator, enhanced end-to-end service provisioning, and reduced operator service overheads.

Goals for ILMI Based Service Provisioning

Configuring and using ADSL Services should be as easy, if not easier, for the residential or small business user as using today's analog dial-up technologies. Not only should installation of the modem in the personal computer ("PC") be "plug and play," but also the user modem and PC are preferably automatically configured to match the ATM network characteristics set by the network service provider 30. The network 60 configuration information is preferably used to support an application that allows the user to be able to automatically select from any service provider 100 that the user is currently subscribed to. In accordance with a preferred embodiment, the user does not even have to enter the ADSL equivalent of a phone number to access a service provider 100, but may do so via an automatically generated icon or a user friendly provider name provided to the user through a graphical interface.

A network service provider 30, sometimes referred to herein as a "carrier," is likely to provide a number of service tiers that are sold to customers. Each tier provides a level of service to connect a user to service providers 100. Although a particular 'tier' may be marketed as a simple concept, the actual configuration of ADSL and ATM parameters required to define it may be extremely complex. Both the user and the carriers own personnel should be protected from contact with the complexities of either technology.

In order to provide these features several functions are implemented, in accordance with a preferred embodiment, throughout an ADSL end to end architecture: 1) A standard method of transporting network configuration information from the carriers' network to the customer CPE 110; 2) Applications on the CPE 110 to access this information, automatically provision the modem and automatically provide a user friendly interface which allows a user to access the service to which they have subscribed; and 3) Interfaces on network equipment, such as DSLAMs 90, to communicate the network configuration to the end users CPE 110.

Interfaces to Network and Service Management systems that allow the configuration of user's services on the carrier's network while isolating the carrier's front line personnel from needing to understand the details of technologies, such as ADSL and ATM.

Service Provisioning Scenarios

Provisioning a users ADSL service requires that the network 60 and the CPE 110 be provisioned in concert. Resources in the network service provider's 30 core ATM network 80 connect the user's termination on the DSLAMs 90 to particular service providers 60. Regardless of whether these resources are permanently configured or are set up on per session basis, the user's service is configured to associate the resources with the service providers 100 that the user is authorized to access.

In the case of preprovisioned connections, one or more application on the user's CPE 110 are provided with information about the configuration of the ATM UNI on the ADSL interface. This information preferably includes an identification of which permanent virtual circuit ("PVC") serves which service provider 100 (e.g. a mapping from the virtual path identifier/virtual channel identifier ("VPI/VCI") to a Service Provider ID), and the ATM quality-of-service ("QoS") parameters of the connection to each service provider 100. In other words, the CPE 110 is configured to associate the appropriate network resources, such as the PVC and quality of service parameters, with the service provider 100 that is accessible through those resources. The service provider ID may be an icon, symbol, or other alpha or alpha-numeric character string that is preferably provided to the user through a graphical interfacer. Each accessible service provider 100 is preferably give an unique Service Provider ID.

In another embodiment of the present invention, switched virtual circuits ("SVCs") are supported either in addition to or as an alternative to preprovisioned connections. When SVCs are supported between the DSLAM 90 and the CPE 110, the user's applications will need to know information about setting up allowable connections. The user is preferably protected from needing to know technical details of ATM technology to place a "call" to a service provider 100. In order to accomplish this, the following information is made available to the user's CPE 110: the ATM addresses of reachable Service Providers 100 with a mapping from these ATM addresses to a 'user friendly' ID, and the ATM QoS parameters that are associated with connections possible for a given user's ADSL service as sold by the network service provider 30.

In either case, the process of configuring a user may be thought of as associating one or more "service profiles", which define connection possibilities to a particular service provider 100 with a 'user profile' which defines the parameters for a particular user's service.

The ATM Forum Integrated Local Management Interface 4.0 (ILMI 4.0) specifies how the Simple Network Management Protocol (SNMP) and an ATM Interface Management Information Base (MIB) are used to provide any ATM device with status and configuration information. Information is available concerning the Virtual Path Connections, Virtual Channel Connections, ATM layer, network addresses distribution and service locations. The CPE 110 is preferably notified about the network configuration in accordance with ILMI 4.0. By extending the existing ILMI MIBs, as described herein, a standards-based channel can be provided that will support the specific needs of ADSL access.

Figure 4:
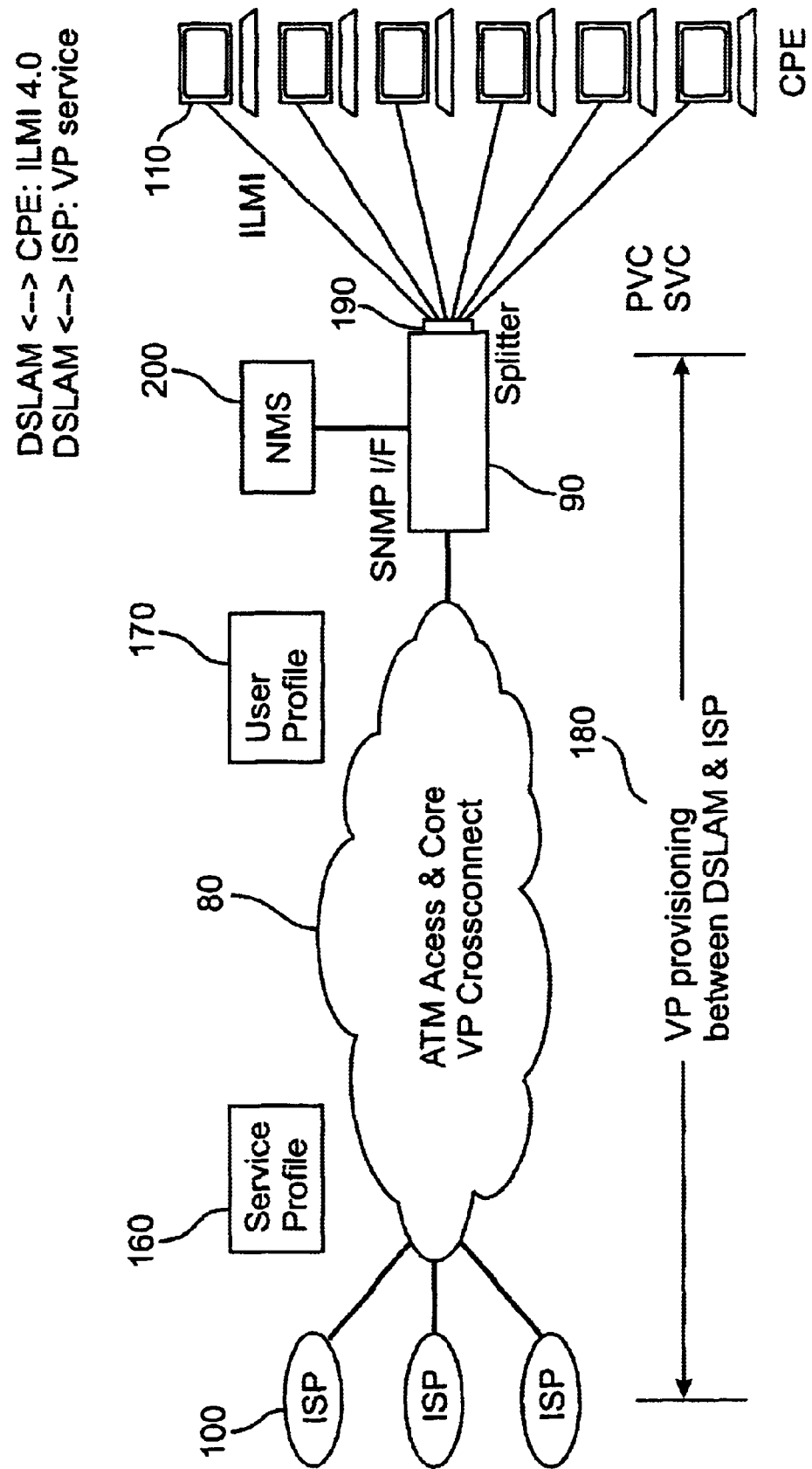
FIG. 4: Service provisioning scenarios

As used herein, "service provisioning" refers to a management concept whereby the user defines what type of service they are interested in creating and the devices to be involved. To make this work, there are three underlying management concepts that the network management system of a preferred embodiment supports: the service profile 160, the user profile 170, and provisioning 180, as shown in FIG. 4. A plurality of CPEs 110 are coupled to the DSLAM 90 through a splitter 190. A network management system 200 is also coupled to the DSLAM 90.

The service profile 160 preferably defines the available ISPs with characteristics of a service, such as a premium quality service. The profile does not need to specify specific devices but instead defines the attribute/values that must be set for a service to meet the quality standards of the service profile 160 (ex: UBR or VBR, and traffic attributes).

The user profile 170 defines the CPE 110 characteristics (such as which Virtual Circuit to use to get to a specific ISP). The user profile 170 does not configure a CPE 110 but defines the attribute/values needed to configure any CPE.

The backbone network provisioning 180 between DSLAM 90 and ISP 100 are initially Virtual Paths (VPs) which are preprovisioned as tunnels by Telco operators. In the long run, end-to-end virtual circuits (VCs) can be dynamically setup as the user initiates the connection.

Automatic Service Provisioning Flows

There are three stages to provisioning an ADSL access network; Network Configuration, User Service Provisioning and Real Time Session Selection and Setup by the user. The details of this scenario describe an architecture based upon Permanent Connections as would occur during market entry deployment for ADSL by a network service provider 30.

Network Configuration:

When new DSLAMs 90 are added or new service providers 100 connect to the carrier's network 60, the carrier's core ATM network 80, the service provider's Wide Area Concentrator (not shown) and the DSLAM 90 must be configured to support the connectivity. Service profiles 160 are created in the carrier's Management System which define the characteristics of possible connections between a User and the service provider 100. The service profile 160 abstracts both general and DSLAM specific information about connectivity to service provider 100 via the Carrier's access network 60.

User Service Provisioning

When a user is added to the carrier's network 160, a user profile 170 is created. The Element Management System assigned a port on the DSLAM 90 to the user, and the user is allowed access to one or more service providers 100. ATM PVC's on the ADSL UNI between the DSLAM 90 and the CPE 110 are assigned for each service provider 100 accessed. They are associated in the DSLAM 90 to the PVC connecting the DSLAM 90 to the particular service provider 100. The Quality of Service (QoS) Parameters for a connection to the service provider 100 by a user are extracted from the service profile 160. The information in the user profile 170 is used to configure the DSLAM 90 with the user specific information. The user profile 170 is transported from the network service provider to the user after the network service provider has created an end-to-end connection so a user can make a service selection. Among other actions the instances of the ILMI MIBs are updated with information about the details of the services available to the end user over their ATM connection.

Real Time Session Selection

The user's CPE 110, upon the user activating the connection or power up, commences using the ILMI protocol to get the information about the connection from the DSLAM 90. Detailed information about the PVC's supported on the customer ADSL UNI are provided the CPE 110 as is information about the service providers 100 'registered' to the user; that is service providers 100 are reachable over that customers interface. This 'registration' includes information mapping each service provider 100 with the ATM virtual circuit that supports the connection. An application on the user's PC 70 preferably presents the registration information to the user in a user friendly form. The application automatically connects the user to the appropriate ATM resource when the user selects a provider 100 from within the application. The application would then establish the PPP connection over the ATM resource. FIG. 5 shows the detailed automatic service provisioning flows.

CPE 110 Automatic Service Selection Application

The design of the interface on the user's computer could take many forms. However the goal of any interface should be to take the information about "registered" service providers and present it to the user in a non-intimidating manner. The list of available service providers may be generated from the registration information provided over the ILMI interfaces. The details of the connection, such as VPI/VCI and the ATM Quality of Service definition for the connection, are also passed over the ILMI. They may be hidden from the user. The specifics of the binding between the communication protocol stack on the user's computer 70 and the ATM service carried over the ADSL connection are managed by the application when the user selects a provider 100 from the list.

The ILMI interface is capable of supporting coordination between the CPE 110 and network 60 as ADSL access matures and evolves. If the connection between the user and service provider 100 is based upon PVCs, the ILMI will be able to convey the details of the specific PVCs, their QoS parameters, and their mapping to specific service providers 100.

If ATM Switched Virtual Circuits (SVCs) are used to connect the user to the provider 100, elements in the ILMI MIB will carry a list of all reachable service providers 100, their ATM addresses, and information about the ATM QoS parameters that are valid for the user's ADSL service. This information will be used by CPE 110 resident applications to request connection setup to a provider. The user is preferably isolated from all ATM specific details. When the user selects the name of the desired service provider 100, information available to the application, provided over the ILMI will generate the Q.2931 messages needed to control the connection.

Service selection may also be based upon support of a tunneling protocol such as L2TP between the DSLAM 90 and the service providers 100 Wide Area Concentrator. In this case, the ILMI service registration MIBs can transport information such as the domain name of reachable service providers to the user's service selection application.

The use of ILMI will provide the following advantages as ADSL service evolves: use of Same MIBs for PVC and SVC; support for Connection Policy Management; support for aggregated bandwidth management for CPE 110; and service Class ID Definition.

FIG. 6 shows an example of a graphical interface for a CPE 110 service selection application. The user need only select the services and the selection can be multiple, for example to have concurrent connections to different ISPs and/or corporate Intranet.

Service MIB Extensions

FIG. 7 illustrates ILMI 4.0MIB tree and service MIB extension in accordance with a preferred embodiment.

The ILMI registration MIB is significant in this scheme. For each reachable service provider 100, an instance of this MIB table is sent over the ILMI to the User's CPE 110. The following attributes provide the information that can be used to by the CPE 110 applications to control connections.

The atmfServiceRegistryATMaddress contains the VPI/VCI information for a PVC connection to a specific service provider, or the ATM address to reach the provider if SVCs are supported.

The atmfServiceRegistryConnType indicates the type of connection supported.

If the connection is a PVC then the atmfServiceRegistryATMaddress contains the VPI/VCI combination of the PVC that connects to the service provider.

If the connection type is SVC then the atmfServiceRegistryATMaddress contains the ATM address required to set up an SVC to that service provider.

The atmfServiceRegParm is a human readable string that contains the name of the Service Provider being registered. This information can be used by applications on the users computer to provide a presentation of service providers 'registered' (reachable) by a particular ADSL customer.

When a PVC is used to support a connection (that is the atmfServiceRegistryConnType has a value of PVC), the atmfServiceRegistryATMaddress MIB attribute will point to an instance of the VCC MIB carried over the ILMI. This MIB will contain the details of the Quality of Service Definition for the connection.

When an SVC is used to support a connection (that is the atmfServiceRegistryConnType has a value of SVC), the connection the atmfServiceRegistryATMaddress attribute contains the valid ATM address of the service provider 100. Implementation of the above-referenced attributes in the ILMI 4.0 registration MIB will be assisted by standardization.

Object Definition in Network Management Systems

At the EMS, the operator manipulates the following entities: service profile, service object, and user object. The service profile is a global abstract specification of a type of service. It can be associated with any service provider 100 that supports that type of service. The service profile may contain the following information: 1. Name/QoS Level: A user-friendly string denoting implied service level, e.g. "Streaming Video", "Browser Lite", etc.; and 2. Service Attributes: A definition of the ATM QoS information associated with the service.

The Service Object is an instance of a specific service provider 100 with a specific service profile on a specific DSLAM 90. Note that the a service provider 100 that supports multiple service profiles will have multiple service objects. Examples of attributes found in a service object may include:

1. Service Name/Profile: A user-friendly string denoting both the service provider and possibly the profile type, e.g. "AOL Browser", "3Com", etc.
2. Domain Name: The transport layer address for this service provider.
3. DSLAM: The DSLAM identifier for this instance of access to the service provider.
4. Service Profile: The service profile for this service object instance
5. Access Type: How to access service provider over the backbone, e.g. VP, VP/VC, L2TP, etc.
6. Access Parameters: The details of the connection to this particular service provider from the particular DSLAM.
7. Reference Attributes: Contact names, phones, etc.

The user object is an instance of a specific user on a specific DSLAM 90 accessing one or more specific service object. Examples of attributes that may be associated with the User Object include:

1. User Name: A user-friendly name for referring to this user
2. DSLAM: The local DSLAM identifier
3. Port identifier: The local port identifier
4. Service List A list of service objects assigned to the user and a mapping to the specific VPI/VCI on the ADSL UNI supporting the connection Migration To Integrated Service Provisioning Implementation of an enhanced ILMI provides a standard interface to pass configuration information to the CPE 110 from the Carrier's Network 60. It allows the CPE 110 to be configured automatically regardless of the service selection methods used in the access network 60. A service selection scenario with a network model is illustrated in FIG. 8.

The ILMI interface discussed with regard to this embodiment will be able to support the following architectural changes as they are added to the networks 60 and hide their details from the user who subscribes to the ADSL services provided by carriers.

1) Evolving the end to end connectivity from one based on permanent connection to one based on switched connection set up in real-time upon user request.
2) Support for multiple qualities of service simultaneously on the same users ADSL connection.
3) Support for Connection Policy Management.
4) Support for ATM Traffic Management which is cognizant of the conditions of the ADSL physical connection.
5) Bonding between the Service Provider and the Carriers management systems to automate end to end provisioning of complex services.
6) Easy migration to end-to-end SVC.

The presently preferred embodiments, as described above, may provide the advantage of meeting one or more of the following requirements:

1) CPE installation should not require a user manual.
2) CPE installation should not require special tools.
3) CPE installation should not require knowledge of the network or network technologies.
4) CPE installation and setup should require a minimum of manual configuration (complete auto-configuration should be our ultimate goal).
5) CPE installation and setup should be consistent across multiple ADSL Access Networks. Variations must be avoided or, if they exist, isolated from the end user.
6) The Network Operator should not be required to physically contact the end user for information about their installed CPE.
7) CPE and the ADSL Access Network configuration's should automatically maintain compatible settings.
8) Reconfiguration of the ADSL Access Network should be allowed independently of the end user CPE.
9) Conversely, rearrangements at the customer premise must not require the manual reconfiguration of the ADSL Access Network.
10) CPE "user friendliness" should be available in all operational environments regardless of higher layer protocols (i.e. IP,IPX, FTP, etc.).

11) "User friendliness" should never require the alteration of Application Programming Interfaces nor affect the operation of the applications from the user's perspective. For example, a WEB Browser, should require no unusual or unnatural user manipulation.

12) "User friendly" operation must be designed for various regulatory environments.

13) "User friendly" operation should not burden the Network Operator with additional operational expenses.

With the advent of distributed computing over ADSL, today, more and more applications are deliverable through an end-to-end broadband client-server service architecture. They include:

Entertainment imaging,

Telecommuting,

Multimedia voice, data, image, and video using on-line database,

E-mail and multimessaging system,

Interactive multimedia applications and games,

Distance learning,

Digital Video Networking and on-line video libraries for home study,

Home automation,

Voice-over-IP Telephony, Videoconferencing, Internet Radio, Video Security, and Monitoring As users in the home or small office/home office (SOHO) environment make use of these applications through resource sharing from multiple PC's and other devices in the home or small office, they drive the need for LAN connectivity within the home or SOHO and access to these applications across the wide area networks.

In accordance with an alternative embodiment of the present invention, characteristics for a transport protocol of a home LAN using an ADSL end-to-end broadband service architecture are provided.

Home Network Over ADSL end-to-end Architecture

As shown in FIG. 9, end-to-end ADSL network architecture may consist of the following subnetworks: the customer premise network 210, the ADSL access network 220, the regional broadband network 230 and the service provider network 240.

The customer premise can be a residence, home office or small business office. Each may contain one or more PCs connected via to each other through the LAN and connected to the service providers through a high-speed ADSL broadband service network. A high-throughput customer premise network or home network can be implemented with, but is not limited to, the following topologies: 1) Star topology with data grade twist-pair cable based on the IEEE P1394 transmission protocol; 2) Bus topology with 10BaseT or 100BaseTX based on the Ethernet protocol with various frame formats such as Ethernet, IEEE 802.3, Ethernet_ SNAP, Netware Ethernet_802.3 and IEEE 802.3u; and 3) Random tree topology based on existing home phone line "network" and use Ethernet technology to provide at 1 Mbps data rate.

As shown in FIG. 10, the star topology includes HomeNet Transceivers 250 to interface peripherals 260 which can be accessed or shared by other Transceivers via a HomeNet Hub 270. An USB based Hub may be applicable to the star topology. The bus topology, shown in FIG. 11, is the most widespread LAN architecture with the most commonly used CSMA/CD as medium access control technique in office environment. Unlike the star and bus traditional LAN architecture, the Home Phoneline network as shown in FIG. 12, does not require new wiring and installation for networking equipment. It leverages existing infrastructure provided by phone wire inside the home. Every RJ-11 modular phone jack in the home can also become a port on the network as well as a phone extension. In addition, the Home Phoneline technology uses the same Windows® NDIS driver as existing Ethernet cards. Home Phoneline technology is proposed by Home Phoneline Network Alliance (HomePNA).

The interface described in this document is independent of the home network topology. Thereby, user access transparency can be achieved.

ADSL technology provides a high-speed interface for delivering differentiated broadband services to home and small businesses via a LAN infrastructure. Today, most of the PCs connected to LANs use TCP/IP based client-server distributed computing for remote access from business environments. As LANs are deployed in the home or SOHO environment this distributed architecture will serve even greater needs when multimedia application becomes mature for home LAN over ADSL. Unlike the current business based support for LANs where both resources and knowledge of data networking administration can be assumed, the home environment will require simple administration and management. By using the existing dial-up transport protocol PPP, the existing interfaces and functions seen by home users when accessing remote applications can be preserved. In other words, the network transparency is a key characteristic for PPP extension.

Transparency is defined as concealing from the user and the remote application the fact that a distributed network connect them. The connectivity is perceived as a whole rather than as a collection of independent physical links.

Access transparency enables the home LAN user to access, either simultaneous or share, single or multiple networks such as the Internet, content provider and corporate without the concern of the underlying access protocols, access medium and access method. For example: IP, IPX, NetWare, AppleTalk over LAN, USB, or IEEE 1394 via either unicast or multi-cast. Simplicity is also an important attribute.

Address transparency enables the home LAN user to access service provider using either a registered or private network address via either traditional or virtual dial-up.

Transport transparency enables home LAN user data to be transported over heterogeneous networks. Both the user and the user's applications need not be concerned with the nature of end to end transport protocols. They could be connection or connection-less, based on PVC or SVC, e.g. Frame Relay, ATM, and IP.

Service transparency enables the home LAN user to subscribe to differentiated grade of services from service provider.

Configuration transparency allows devices to the home LAN system to be provisioned automatically without user's intervention.

Scaling transparency allows devices and applications within the home LAN system to expand in scale without changing to the system structure and application algorithms.

Triple 'A' transparency satisfies requirements for Authentication, Address Allocation, and Accounting

Architecture

There have been two approaches to support the PPP over Ethernet: tunneling and encapsulation. PPTP (point to point tunneling protocol) and L2TP (level 2 Tunneling Protocol) are tunneling architectures while PPP proxy, RFC1483 bridging, and BMAP are encapsulation solutions. Tunneling architectures have advantages with regard to access, address, transport and service transparency but are more complicated in their software. On the other hand, PPP proxy and RFC1483 have the advantage for being simpler but they are not transparent. A preferred embodiment of the present invention uses the following: 1) Multiplex PPP sessions over limited VCC resource; 2) QoS matching between PPPs and VCCs; and 3) Service Provisioning and selection.

Designing a PPP extension over ADSL interface to meet the characteristics is a challenging task. In order to satisfy the requirements, the architecture proposed here satisfies the characteristics specified above and is designed to take the following entities into considerations:

1. The protocol must provide an entity which performs traditional and virtual dial-up for accessing ISP and VPN simultaneously. That entity is independent of the native transport protocol that exist in the user's environment. (Access and Address transparency)
2. The protocol must provide an entity which is able to interface to heterogeneous networks with a signaling capability for requesting the desired quality of service. (Transport transparency)
3. The protocol must provide a interface to network management for service provisioning, fault, performance and accounting management. (Configuration, Service and Triple 'A' transparency)
4. The architecture must allow flexible network expansion without degrading the service to others. (Scaling transparency)

And, those entities should be allocated between the client-PC and the ATU-R based upon two design principles:

1. In order to ease the transition for the user, the ATU-R developers must absorb and hide the protocol complexity from user. The complexity must strive for a minimum in order to facilitate development and win early market acceptance.
2. Standard changes must be minimized when the design requires a new or modifies an existing protocol.

Recognizing the design challenges, principles and objectives, a transparency based architecture is proposed as illustrated in FIG. 13. This architecture contains the following elements to satisfy the four entities specified above:

1. Dial-up. A window-based application, e.g., Microsoft Window 95/98/NT or vendor specific window application to provide GUI for user to specify the call related parameters such as source/destination network address, User ID, Password and desired QoS etc.,
2. Network Access. It is the network protocol for establishing and terminating calls for switched virtual circuit (SVC) prior to PPP connection. It should perform the following functions:
   Syntax checking to call related messages according to the nature of network types, e,g, frame relay, ATM, etc.,
   Process multiple call requests and assign call reference number
   provide a reliable transport over Ethernet for call control messages
3. Service Specific Convergence Sub-layer (SSCS). It provides network transport service for virtual point-to-point connection, control and priority queue management. It also maintains an address table of matching between VPI/VCI and CONNECTION ID. Per user's desire, multiple PPP sessions can either terminate here for multiplexing or transparently passing through.
4. Communication Driver. It provides a low level peer to peer reliable communications. The driver is operated as mailbox with distinct address and provides reliable communications between peer-to-peer. Most importantly, the driver has both multiplexing and de-multiplexing capabilities to support simultaneous requests. It can support multiple PPP sessions in the same PC with multiple IP addresses.
5. Address Server. It provides an optional network address resolution service to user for establishing a switched virtual circuit. The server can locate either at CO or co-locate at ATU-R.

In order for the architecture to work, a set of service primitives and their parameters need to be defined between communication drivers. An overview of the operation between the ATU-R and PCs is described below:

1. After start-up, each client-PC sends a broadcast "NEW" message which identifies itself to other devices on the LAN. Only ATU-R (or ATU-Rs) will respond the "NEW" message with ACK. The purpose of the "NEW" message is to obtain the ATU-R or ATU-Rs' MAC address. One ATU-R is assumed in this overview description.
2. Client-PC then sends "PVC UPLOAD REQUEST" message to ATU-R to obtain PVC service profile
3. For PVC operation, client-PCs who wish to use service send "SERVICE REQUEST" to ATU-R. VCCs can be shared in either one-to-one or many-to-one relationships. First Come First Serve (FCFS) is used for one-to-one relationship. Multiplexing is used for many-to-one relationship.
4. In the case of FCFS, ATU-R will respond a CONNECTION ID (token[1]) to the first received service request from a PC. Other PCs without the connection ID can send service request repeatly until a connection ID is granted. Only the PC with the connection ID will start the PPP session. The connection ID serves an association between VCC and client-PC. When PC finished the service, a "RELEASE REQUEST" message containing the connection ID is sent to ATU-R to relinquish the association. Idle time-out is also used by ATU-R to monitor the activity between PC and ATU-R. ATU-R can send the "RELEASE REQUEST" to PC if the idle timer is expired.

[1]ATU-R controls number of tokens, or connection ID, to be available to client-PC based upon available resources 5. In the case of multiplexing, ATU-R will respond connection IDs upto allowed service request messages received from client-PCs on the LAN. ATU-R can use either L2TP like or IDLC (proposed in this document) to carry multiple-PPP over single VCC.
6. For the SVC operation, the client-PC dial-up application initiates a "CALL REQUEST" with destination network address, desired QoS and traffic descriptors to ATU-R. ATU-R will respond a connection ID after a successful VCC establishment. ATU-R then bind VCC, connection ID and client-PC together. After the usage, the client-PC sends "CALL RELEASE" to relinquish the binding. ATU-R may optionally perform network address resolution protocol (ARP) when the destination address is unknown prior to the call. The ARP will require an address server be available to ATU-R. The detail of the ARP is vendor implementation specific.

Messages Between ATU-R and Client-PCs (T-SM Interface)

This section provides the proposed message types encapsulated in the IEEE 802.2 LLC sub-frame and exchanged between ATU-R and client-PCs. Three message types are defined as follows:

Connection control message deals with call establishment and release and other control information necessary for providing switched services. Connection control messages are sent by client-PC and responded by ATU-R.

Management message provides exchange information for configuration, fault and performance management. Management messages are sent by client-PC and ATU-R.

Payload message is the PPP payload packets carrying user data. A connection ID is appended to each PPP packet in the data field of the Ethernet frame. NLPID of 0xCF is used for identifying PPP message type.

Both connection control and management messages are encapsulated in the data field of the physical medium dependent frames. They are sent and received by low level driver independent of payload traffic. They share the same format but distinguished by message identifiers.

Connection control and Management message format

| 0 | 1 2 3 4 5 6 7 | 8 9 10 11 12 13 14 15 |
|---|---|---|
| S | Reserved | Version |
| Length | | Length |
| Message Identifier | | Message Type |
| Up to N Information Elements | | |
| N * Word < Ethernet frame payload length | | |

The payload message which is carrying PPP packets is encapsulated in the data field of the physical medium dependent frame. The payload message has the format illustrated below:

Payload message format

| 0 | 1 2 3 4 5 6 7 | 8 9 10 11 12 13 14 15 |
|---|---|---|
| S | Reserved | Version |
| Length | | Length |
| Message Identifier | | Message Type (0xCF) |
| Connection ID | | PPP Packet |
| Up to N length | | |
| N * Word < Ethernet frame payload length | | |

Bit 0 is a significant bit when set to 1 indicated acknowledgement is required
Bit 1–7 are reverse bits; Bit 8–15 are version control bits; Bit 16–31 are length of the message
Table 1 lists the message identifiers for the proposed messages:

TABLE 1

Message Identifier

| | Message Identifier |
|---|---|
| Connection Control | 0x01 |
| Management | 0x02 |
| Payload | 0x03 |

Three message types can be carried by either an Ethernet or an Ethernet-SNAP frame and they are illustrated below:

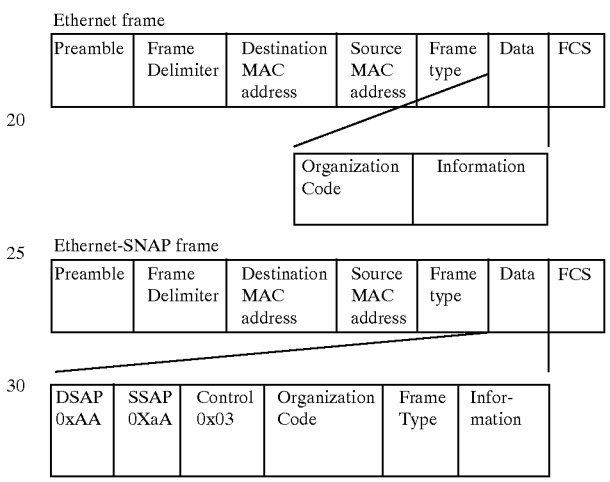

In addition to carrying the proposed interface messages, both the Ethernet and the Ethernet-SNAP frames provide a mechanism to differentiate other proposed PPP extensions by using the organization code which references the assigner of the frame type field. Table 2 gives an example of the organization code associated with manufacturers and Ethernet frame types

TABLE 2

Example of the representative PPP extension manufacturers IDs

| Manufacturer | Organization Code | Frame Type for Ethernet-SNAP | Frame Type for Ethernet |
|---|---|---|---|
| 3Com | zz-yy-xx | SHIM | PPPOE |
| Intel | zz-yy-xx | BMAP | PPPOE |
| Microsoft | zz-yy-xx | NDIS | PPPOE |
| UUNET/RedBack | zz-yy-xx | PPPOE | PPPOE |

Connection Control Messages

Control messages are used to establish and clear user connections. The control connection can be initiated by both a client-PC and ATU-R. Control messages are reliably sent by the lower level transport such as communication driver. This section lists an overview of the control message format and structure, which highlights the information elements of each message. Table 3 summarizes the connection control messages between ATU-R and client-PC.

TABLE 3

Connection control messages

| Message | Message Type | Reference |
|---|---|---|
| PVC UPLOAD REQUEST | 0x01 | 5.1.1 |
| PVC UPLOAD RESPONSE | 0x02 | 5.1.2 |
| PVC UPDATE | 0x03 | 5.1.3 |
| PVC SERVICE REQUEST | 0x04 | 5.1.4 |
| PVC SERVICE RESPONSE | 0x05 | 5.1.5 |
| GET NETWORK ADDRESS (SVC) | 0x06 | 5.1.6 |
| NETWORK ADDRESS RESPONSE (SVC) | 0x07 | 5.1.7 |
| ATM Q.2931 (SVC) | 0x08 | 5.1.8 |
| FRAME RELAY Q.931 (SVC) | 0x09 | 5.1.9 |
| SVC CALL RESPONSE (SVC) | 0x0A | 5.1.10 |
| ACK | 0x0B | 5.1.11 |
| NAK | 0x0C | 5.1.12 |

PVC UPLOAD REQUEST

This message is sent by client-PC to ATU-R to request an update on all PVCs. This message is sent to all discovered ATU-Rs.

| | |
|---|---|
| Identifier: | CONNECTION CONTROL |
| Message Type: | PVC UPLOAD REQUEST |
| Significance: | local |
| Direction: | PC to ATU-R |

| Information Element | Direction | Type | Length (bits) |
|---|---|---|---|
| Destination MAC address | PC -to- ATU-R | M | 48 |
| Source MAC address | PC -to- ATU-R | M | 48 |

PVC UPLOAD RESPONSE

This message is sent by ATU-R to client-PC to upload the PVC status; all PVCs are uploaded.

| | |
|---|---|
| Identifier: | CONNECTION CONTROL |
| Message Type: | PVC UPLOAD RESPONSE |
| Significance: | local |
| Direction: | ATU-R to PC |

| Information Element | Direction | Type | Length (bits) |
|---|---|---|---|
| Destination MAC address | ATU-R -to- PC | M | 48 |
| Source MAC address | ATU-R -to- PC | M | 48 |
| Number of VCCs configured | ATU-R -to- PC | M | 8 |
| VCC number | ATU-R -to- PC | M | 8 |
| VPI and VCI | ATU-R -to- PC | M | 24 |
| Domain name | ATU-R -to- PC | M | 48 |
| Service category | ATU-R -to- PC | M | 8 |

PVC UPDATE

This is an autonomous message and it is sent by ATU-R to client-PC to reflect the changes of the PVC status dynamically.

| | |
|---|---|
| Identifier: | CONNECTION CONTROL |
| Message Type: | PVC UPLOAD RESPONSE |
| Significance: | local |
| Direction: | ATU-R to PC |

| Information Element | Direction | Type | Length (bits) |
|---|---|---|---|
| VPI and VCI | ATU-R -to- PC | M | 24 |
| PVC Status | ATU-R -to- PC | M | 8 |

PVC SERVICE REQUEST

This message is sent by client-PC to ATU-R to indicate the wish of connecting a PVC service. The service domain name may be numerical representations; this is implementation specific.

| | |
|---|---|
| Identifier: | CONNECTION CONTROL |
| Message Type: | PVC SERVICE REQUEST |
| Significance: | local |
| Direction: | PC to ATU-R |

| Information Element | Direction | Type | Length (bits) |
|---|---|---|---|
| Source MAC address | PC -to- ATU-R | M | 48 |
| Service domain name | PC -to- ATU-R | M | 48+ |

PVC SERVICE RESPONSE

This message is sent by ATU-R to client-PC to indicate the status or the result of the service request.

| | |
|---|---|
| Identifier: | CONNECTION CONTROL |
| Message Type: | PVC SERVICE RESPONSE |
| Significance: | local |
| Direction: | ATU-R to PC |

| Information Element | Direction | Type | Length (bits) |
|---|---|---|---|
| PVC Status | ATU-R -to- PC | M | 8 |
| Connection ID | ATU-R -to- PC | M | 8 |

GET NETWORK ADDRESS

This message is sent by client-PC to ATU-R requesting the network address, e,g, ATM E.164, of a known service domain name for SVC purpose. ATU-R may return NAK if no address server function is available.

| | |
|---|---|
| Identifier: | CONNECTION CONTROL |
| Message Type: | GET NETWORK ADDRESS |
| Significance: | local |
| Direction: | PC to ATU-R |

| Information Element | Direction | Type | Length (bits) |
|---|---|---|---|
| Source MAC address | PC -to- ATU-R | M | 48 |
| Service domain name | PC -to- ATU-R | M | 48 |

NETWORK ADDRESS RESPONSE

This message is sent by ATU-R to respond the GET NETWORK ADDRESS request.

| | |
|---|---|
| Identifier: | CONNECTION CONTROL |
| Message Type: | NETWORK ADDRESS RESPONSE |
| Significance: | local |
| Direction: | ATU-R to PC |

ATU-R sends the network address to client-PC after resulting the address translation.

| Information Element | Direction | Type | Length (bits) |
|---|---|---|---|
| Network address* | ATU-R -to- PC | M | 24 |

*ATU-R sends NAK if no address server is available. The network address format is network dependent -- DLCI for frame relay and VPI/VCI for ATM.

SVC CALL RESPONSE

This message is sent by ATU-R TO CLIENT-PC after a SVC attempt. If call attempt is failed, the call status will return an error code, see Table 2, with both VPI/VCI and connection ID be 0s.

| | |
|---|---|
| Identifier: | CONNECTION CONTROL |
| Message Type: | SVC CALL RESPONSE |
| Significance: | local |
| Direction: | ATU-R to PC |

| Information Element | Direction | Type | Length (bits) |
|---|---|---|---|
| Call status | ATU-R -to- PC | M | 4 |
| Connection ID | ATU-R -to- PC | M | 8 |
| VPI and VCI | ATU-R -to- PC | M* | 24 |

*VPI/VCI field is mandatory only if client-PC has ATM layer.

ATM Q.2931 Signaling Messages

This message is supported when client-PC installed ATM signalling stack. See ATM UNI 3.1 and 4.0. Q.2931 messages are encapsulated in the connection control message format.

| | |
|---|---|
| Identifier: | CONNECTION CONTROL |
| Message Type: | Q2931 |
| Significance: | local |
| Direction: | PC to ATU-R; ATU-R to PC |

Frame Relay Q.931 Signaling Messages

| | |
|---|---|
| Identifier: | CONNECTION CONTROL |
| Message Type: | Q931 |
| Significance: | local |
| Direction: | PC to ATU-R; ATU-R to PC |

This message is supported when client-PC installed Frame Relay signalling stack. See Frame Relay Forum FRF documents. Q.931 messages are encapsulated in the connection control message format.

ACK

This message can be sent by either ATU-R or PC to acknowledge of receiving the connection control message. This message contains requesting control message in the information element field.

| | |
|---|---|
| Identifier: | CONNECTION CONTROL |
| Message Type: | ACK |
| Significance: | local |
| Direction: | ATU-R to PC; PC to ATU-R |

| Information Element | Direction | Type | Length (bits) |
|---|---|---|---|
| Requesting message type | ATU-R-to-PC PC-to-ATU-R | M | 8 |
| ATU-R MAC address* | ATU-R-to-PC* | M* | 48* |

*This element is required only when respond to NEW message from client-PCs by every ATU-Rs.

NAK

This message is sent by ATU-R to CLIENT-PC to indicate a negative result. This message contains error code as specified in Table 2.

| | |
|---|---|
| Identifier: | CONNECTION CONTROL |
| Message Type: | NAK |
| Significance: | local |
| Direction: | ATU-R to PC |

| Information Element | Direction | Type | Length (bits) |
|---|---|---|---|
| Error code | ATU-R-to-PC | M | 8 |

Table 4 lists a set of identified error codes.

TABLE 4

Error code

| Error Code | Meaning |
|---|---|
| 0x00-0x0F | Reserved and not used |
| 0x10 | Can not locate an address server for network address resolution |
| 0x11 | Can not find VCC to match the requested service domain name |
| 0x12 | No response from the far end |
| 0x13 | Can not recognize the message |
| 0x14 | ADSL modem is not available |
| 0x15 | Can not make a connection due to resource busy |
| 0x16 | Can not make a connection due to internal ATU-R timeout |
| 0x17 | Can not make a SVC connection |
| 0x18 | No SVC signalling stack in ATU-R |

Management Messages

This section lists an overview of the management message structure, which highlights the information elements of each message. Table 5 summarizes the management messages between ATU-R and client-PCs.

TABLE 5

Management messages

| Message | Message Type | Reference |
|---|---|---|
| NEW | 0x01 | 5.2.1 |
| QUERY | 0x02 | 5.2.2 |
| QUERY RESPONSE | 0x03 | 5.2.3 |
| RELEASE REQUEST | 0x04 | 5.2.4 |
| RELEASE CONFIRM | 0x05 | 5.2.5 |

NEW

This is a broadcast message and it is sent by the client-PC to indicate the presence of the PC. The sending of this message is mandatory ('M') and continuously until getting ACK response back from ATU-R or ATU-Rs. Client-PC can re-send this message for the purpose of updating ATU-R MAC address.

| Identifier: | MANAGEMENT | | |
|---|---|---|---|
| Message Type: | NEW | | |
| Significance: | local | | |
| Direction: | PC to ATU-R | | |
| Information Element | Direction | Type | Length (bits) |
| Source MAC address | PC-to-ATU-R | M | 48 |

QUERY

This message is sent by both the client-PC and ATU-R to check the specific status of each other. The sending of this message is mandatory ('M').

| Identifier: | MANAGEMENT | | |
|---|---|---|---|
| Message Type: | QUERY | | |
| Significance: | local | | |
| Direction: | PC to PC; PC to ATU-R; ATU-R to PC | | |
| Information Element | Direction | Type | Length (bits) |
| Destination MAC address | all | M | 48 |
| Source MAC address | all | M | 48 |
| Query Type | all | M | 8 |

Where the Query Type is a 8-bit identifier to distinguish the type of query.

| Query type | bit 0 | bit 1 | bit 2 | bit 3 | bit 4 | bit 5 | bit 6 | bit 7 |
|---|---|---|---|---|---|---|---|---|
| PVC Status | 1 | 0 | 0 | 0 | 0 | 0 | 0 | 0 |
| SVC Status | 0 | 1 | 0 | 0 | 0 | 0 | 0 | 0 |
| PC Status | 1 | 1 | 0 | 0 | 0 | 0 | 0 | 0 |

QUERY RESPONSE

This message is sent by both the client-PC and ATU-R to response the QUERY request specified by type. The number of VPI/VCI and PVC fields are variables and depending on provisioned PVCs.

| Identifier: | MANAGEMENT | | |
|---|---|---|---|
| Message Type: | QUERY RESPONSE | | |
| Significance: | local | | |
| Query Type: | PVC Status | | |
| Direction: | ATU-R to PC | | |
| Information Element | Direction | Type | Length (bits) |
| Destination MAC address | ATU-R-to-PC | M | 48 |
| Source MAC address | ATU-R-to-PC | M | 48 |
| VPI/VCI | ATU-R-to-PC | M | 24 |
| PVC status | ATU-R-to-PC | M | 4 |

| Identifier: | MANAGEMENT | | |
|---|---|---|---|
| Message Type: | QUERY RESPONSE | | |
| Significance: | local | | |
| Query Type: | SVC Status | | |
| Significance: | local | | |
| Direction: | ATU-R to PC | | |
| Information Element | Direction | Type | Length (bits) |
| Destination MAC address | ATU-R-to-PC | M | 48 |
| Source MAC address | ATU-R-to-PC | M | 48 |
| VPI/VCI (SVC) | ATU-R-to-PC | M | 24 |
| Status | ATU-R-to-PC | M | 4 |

| Identifier: | MANAGEMENT |
|---|---|
| Message Type: | QUERY RESPONSE |
| Significance: | local |
| Query Type: | PC Status |
| Significance: | local |
| Direction: | PC to PC, PC to ATU-R and ATU-R to PC |

Both PC and ATU-R will return either ACK or NAK to represent the PC status.

RELEASE REQUEST

This message is sent by PC to ATU-R, or ATU-R to PC, to relinguish connection.

| Identifier: | MANAGEMENT | | |
|---|---|---|---|
| Message Type: | RELEASE REQUEST | | |
| Significance: | local | | |
| Direction: | PC to ATU-R; ATU-R to PC | | |
| Information Element | Direction | Type | Length (bits) |
| Connection ID | PC-to-ATU-R ATU-R-to-PC | M | 8 |

RELEASE CONFIRM

This message is sent by ATU-R to PC, or PC to ATU-R, to acknowledge the relinguish.

| Identifier: | MANAGEMENT | | |
|---|---|---|---|
| Message Type: | RELEASE CONFIRM | | |
| Significance: | local | | |
| Direction: | ATU-R to PC; PC to ATU-R | | |
| Information Element | Direction | Type | Length (bits) |
| Connection ID | ATU-R-to-PC PC-to-ATU-R | M | 8 |

Payload Messages

User data are encapsulated in PPP packet over either an Ethernet or an Ethernet_SNAP frame, both the organization code and the frame type are needed for identifying vendor specific payload.

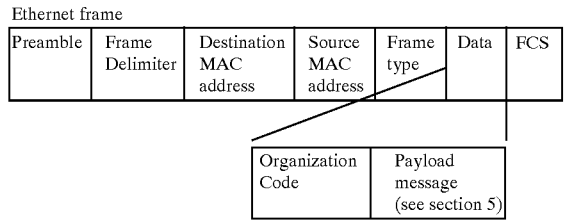

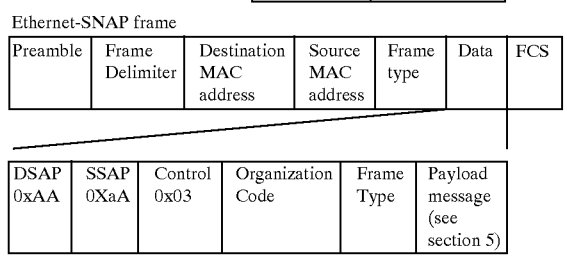

EXAMPLE

Service Provisioning

In order to maximize the configuration transparency, automatic service provisioning is necessary and it can be achieved by using ILMI between ATU-R and ATU-C. Nevertheless, the service provisioning is a management concept whereby the user defines what type of service they are interested in crerating and the device to be involved. Table 6 lists an example of the available services profile after the provisioning. The service profile is stored in ATU-R.

TABLE 6

Service profile (example)

| VPI/VCI | Type | QoS Category | Traffic Descripter | Service Domain Name | Status |
|---|---|---|---|---|---|
| 3/10 | PVC | UBR | not specified | AOL.com/ubr | Up |
| 5/11 | PVC | rt_VBR | PCR = 1200 SCR = 600 | AOL.com/rtvbr | Up |
| 5/12 | PVC | CBR | PCR = 1200 | AOL.com/cbr | Down |
| 10/25 | PVC | UBR | not specified | 3COM-VA.com/ubr | Up |
| 10/27 | SVC | UBR | not specified | 3COM-MA.com/ubr | Up |

Service Selection

A list of available PVCs and their domain names are sent from ATU-R to PCs in response to PVC UPLOAD message. Client-PC then construct a user profile for the purpose of service connection. An example of the user profile is given in FIG. 14.

Table 7 lists key procedures of service selection and messages which are exchanged between client-PC and ATU-R.

TABLE 7

Service selection procedure

|  | Client-PC |
|---|---|
| 1. Receives "PVC SERVICE REQUEST" control message and verify the status of corresponding VCC | 1. Any user wishes to use the service is simply click the Window Dial-up application and select the available service from profile. |
| 2. Send "NAK" with error code if VCC is down | 2. Send "PVC SERVICE REQUEST" control message to ATU-R. A domain name is used to signal ATU-R the desired service. |
| 3. Otherwise, assign a CONNECTION ID and send "PVC SERVICE RESPONSE" control message to PC | 3. Receive "PVC SERVICE REPONSE" control message with connection ID. |
|  | 4. Start to initiate a PPP session |

The present embodiments preferably encompass logic to implement the described methods in software modules as a set of computer executable software instructions. A Central Processing Unit ("CPU") or general purpose microprocessor implements the logic that controls the operation of the interactive system. The microprocessor executes software that can be programmed by those of skill in the art to provide the described functionality. The software can be represented as a sequence of binary bits maintained on a computer readable medium including magnetic disks, optical disks, organic disks, and any other volatile or (e.g., Random Access memory ("RAM")) non-volatile firmware (e.g., Read Only Memory ("ROM")) storage system readable by the CPU. The memory locations where data bits are maintained also include physical locations that have particular electrical, magnetic, optical, or organic properties corresponding to the stored data bits. The software instructions are executed as data bits by the CPU with a memory system causing a transformation of the electrical signal representation, and the maintenance of data bits at memory locations in the memory system to thereby reconfigure or otherwise alter the unit's operation. The executable software code may implement, for example, the methods described above.

It should be understood that the programs, processes, methods and apparatus described herein are not related or limited to any particular type of computer or network apparatus (hardware or software), unless indicated otherwise. Various types of general purpose or specialized computer apparatus may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used than are shown in the block diagrams.

It should be understood that a hardware embodiment may take a variety of different forms. The hardware may be implemented as a digital signal processor or general purpose microprocessor with associated memory and bus structures, an integrated circuit with custom gate arrays or an application specific integrated circuit ("ASIC"). Of course, the embodiment may also be implemented with discrete hardware components and circuitry.

The claims should not be read as limited to the described order of elements unless stated to that effect. In addition, use of the term "means" in any claim is intended to invoke 35

U.S.C. §112, paragraph 6, and any claim without the word "means" is not so intended. Therefore, all embodiments that come within the scope and spirit of the following claims and equivalents thereto are claimed as the invention.

We claim:

1. A transparent end-to-end asymmetric digital subscriber line system, including a subscriber's ADSL modem for delivering differentiated broadband services to a local area network, comprising in combination:
   a dial-up application on customer premise equipment for providing a user interface for a user that requests ADSL service allowing the user to select services for connection to specify communication parameters;
   an asymmetric network access protocol for establishing and terminating communications on the asymmetric digital subscriber line system;
   a service specific convergence sub-layer for providing a network transport service for virtual point-to-point connections and virtual multi-point connections;
   a communications driver for providing low level peer-to-peer reliable communications; and
   an address server for providing an optional network address resolution service for establishing a switched virtual circuit.

2. The system of claim 1 wherein the dial-up application includes a dial-up application for any of the Windows 95, Windows 98 or Windows NT operating systems.

3. The system of claim 1 wherein the asymmetric network access protocol provides any of:
   checking syntax for communication messages according to a type of network being used;
   processing multiple communication requests and assigning communication request reference numbers; or
   providing a reliable transport over an Ethernet local area network for communications messages.

4. The system of claim 1 wherein the service specific convergence sub-layer includes network transport services for:
   managing control queues and priority queues; and
   maintaining an address table matching an asynchronous transport mode virtual path identifier or an asynchronous transport mode virtual channel identifier and a call connection identifier.

5. The system of claim 1 wherein the communications driver includes:
   multiplexing and de-multiplexing capabilities to support simultaneous communication requests including multiple Point-to-Point protocol sessions with multiple Internet Protocol addresses.

6. The system of claim 1 wherein the address server can be located in either an Asymmetric Digital Subscriber Line (ADSL) Transmission Unit—Central Office (ATU-C) device or an ADSL Transmission Unit—Remote (ATU-R) device.

7. The system of claim 1 wherein the asymmetric network protocol includes a plurality of connection control messages, management messages and payload messages.

8. The system of claim 7 wherein the connection control messages include a Permanent Virtual Circuit (PVC) upload request, PVC upload response, PVC update, PVC service request, PVC service response, get network address, network address response, Asynchronous Transfer Mode (ATM) Q.2931, Frame Relay Q.931, Switched Virtual Circuit (SVC) call response, ACK, and NAK messages.

9. The system of claim 8 wherein the management messages includes a new, query, query response, release request and release confirm message.

10. The system of claim 8 wherein the payload messages include an Ethernet frame and an Ethernet-Subnetwork Access Protocol (Ethernet-SNAP) frame message.

11. A method for delivering differentiated broadband services to a local area network from transparent end-to-end asymmetric digital subscriber line system, comprising the steps of:
   sending a first broadcast message with an asymmetric network access protocol from an individual network device on a local area network, to a plurality of other network devices on the local area network, wherein first broadcast message includes a network address for the individual network device on the local area network;
   sending a first request message with an asymmetric network access protocol from the individual network device to a first asymmetric network device to obtain a service profile on the individual network device from the first asymmetric network device, wherein the service profile is used to a private virtual circuit on the asymmetric digital subscriber line system;
   receiving a first response message with an asymmetric network access protocol on the individual network device from the first asymmetric network device, wherein the first response message includes a service profile for the individual network device;
   sending a second request message with an asymmetric network access protocol from the individual network device to the first asymmetric network device to request use of a communications service on the asymmetric digital subscriber line system, wherein the communications service includes a one-to-one or a one-to-many connection service; and
   receiving a second response message with an asymmetric network access protocol on the individual network device from the first asymmetric network device, wherein the second response message includes a connection identifier for the individual network device.

12. A computer readable medium having stored therein instructions for causing a central processing unit to execute the method of claim 11.

13. The method of claim 11 wherein the step of sending a first broadcast message includes sending a NEW message from a set of connection control messages that identifies the individual network device to the local area network.

14. The method of claim 11 wherein the step of sending a first broadcast message includes sending a Medium Access Protocol address of the individual network of device as the network address in the first broadcast message.

15. The method of claim 11 wherein the individual network device is a personal computer and the asymmetric network device is an asymmetric digital subscriber line ATU-R device.

16. The method of claim 11 wherein the asymmetric network protocol includes a plurality of connection control messages, management messages, and payload messages.

17. The method of claim 11 wherein the step of sending a first request message includes sending a PVC upload request message from a set of connection control message from an asymmetric network access protocol to obtain a PVC service profile.

18. The method of claim 11 wherein the step of receiving a first response message includes receiving a first response message with a service profile comprising automatic transparent service provisioning information.

19. The method of claim 18 wherein the automatic transparent service provisioning information in the service profile includes any of a virtual path identifier, a virtual circuit identifier, a type of communication service, a quality-of-service category, a traffic descriptor, a service domain name or a status.

20. The method of claim 11 wherein the step of sending a second request message includes sending any of a PVC service request message, an ATM Q.2931, or a Frame Relay Q.931 message from a set of connection control messages from an asymmetric network access protocol.

21. The method of claim 11 wherein the step of receiving a second response message includes receiving service response message from a set of connection control messages from an asymmetric network access protocol.

22. The method of claim 11 wherein the step of receiving a second response messages includes receiving a connection identifier from an asymmetric digital subscriber line ATU-R device to establish a one-to-one Point-to-Point Protocol session between the individual network device and the an asymmetric digital subscriber line ATU-R device, wherein the connection identifier is used to associate a virtual channel connection on the asymmetric digital subscriber line system to the individual network device.

23. The method of claim 11 wherein the step of receiving a second response messages includes receiving a plurality of connection identifier from an asymmetric digital subscriber line ATU-R device to establish many-to-one session between the individual network device and the plurality of other network devices on the local area network, wherein the plurality of connection identifiers are used to associate a virtual channel connection to a multiple-Point-to-Point Protocol session on the asymmetric digital subscriber line system to the individual network device and the plurality of other network devices on the local area network.

24. The method of claim 23 wherein an asymmetric network device comprising an asymmetric digital subscriber line ATU-R device uses either Layer 2 Tunneling Protocol (L2TP) or High Level Data Link Control (HDLC) to carry the multiple-Point-to-Point Protocol session over a single virtual channel connection.

25. The method of claim 11 further comprising:

sending a third request message with an asymmetric network access protocol from the individual network device to the first asymmetric network device to request use of a communications channel on the asymmetric digital subscriber line system; and receiving a receiving a third response message with an asymmetric network access protocol on the individual network device from the first asymmetric network device, wherein the second response message includes a connection identifier for the individual network device.

26. The method of claim 25 wherein the step of sending a third request message includes sending a switched virtual circuit request message including any of Asynchronous Transfer Mode (ATM) Q.2931 message or a Frame Relay Q.931 message with a destination network address, a desired quality-of-service parameters and traffic descriptors.

27. The method of claim 25 wherein the step of receiving a third response message includes receiving a SVC call response message from a set of connection control messages from an asymmetric network access protocol, wherein the SVC call response message includes a connection identifier for a virtual channel connection between the individual network device and the asymmetric network device.

* * * * *